United States Patent
Zhang

(10) Patent No.: US 11,374,857 B2
(45) Date of Patent: Jun. 28, 2022

(54) NETWORK DEVICE MANAGEMENT METHOD AND APPARATUS, AND SYSTEM FOR INDICATING A NETWORK DEVICE TO PERFORM MANAGEMENT OPERATION

(71) Applicant: Huawei Technologies Co., Ltd., Shenzhen (CN)

(72) Inventor: Yongkang Zhang, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/033,385

(22) Filed: Sep. 25, 2020

(65) Prior Publication Data

US 2021/0014158 A1 Jan. 14, 2021

Related U.S. Application Data

(63) Continuation of application No. PCT/CN2019/078537, filed on Mar. 18, 2019.

(30) Foreign Application Priority Data

Mar. 30, 2018 (CN) .......................... 201810277234.9

(51) Int. Cl.
*H04L 45/30* (2022.01)
*H04L 45/302* (2022.01)
(Continued)

(52) U.S. Cl.
CPC ............ *H04L 45/306* (2013.01); *H04L 45/20* (2013.01); *H04L 45/38* (2013.01); *H04L 45/42* (2013.01); *H04L 47/2425* (2013.01)

(58) Field of Classification Search
CPC ..... H04L 41/042; H04L 45/20; H04L 45/306; H04L 45/38; H04L 45/42; H04L 47/2425; H04W 24/02
See application file for complete search history.

(56) References Cited

U.S. PATENT DOCUMENTS 8,615,015 B1* 12/2013 Shekhar .................. H04L 45/54
370/400
9,509,604 B1* 11/2016 Livesey .................. H04L 47/17
(Continued)

FOREIGN PATENT DOCUMENTS

CN 101459602 A 6/2009
CN 101512980 A 8/2009
(Continued)

OTHER PUBLICATIONS

Behringer, M et al., "Autonomic Networking: Definitions and Design Goals," Internet Research Task Force (IRTF); Request for Comments: 7575, Category: Informational, ISSN: 2070-1721, Jun. 2015, 16 pages.
(Continued)

*Primary Examiner* — Dung B Huynh
(74) *Attorney, Agent, or Firm* — Slater Matsil, LLP

(57) ABSTRACT

A network device management method for a first network device in autonomic networking includes obtaining management information of a service flow, the management information comprising a type of a management operation and an identifier of the service flow, and the first network device being an ingress network device of the service flow, determining a second network device on a forwarding path of the service flow based on the identifier of the service flow, the second network device being a next-hop network device of the first network device, sending a control packet having the management information to the second network device, the control packet indicating to the second network device to perform a management operation based on the type of the management operation and obtain information associated with the management operation, receiving, from the second network device, a response packet having information associated with the management operation.

22 Claims, 6 Drawing Sheets

(51) Int. Cl.
*H04L 45/00* (2022.01)
*H04L 45/42* (2022.01)
*H04L 47/2425* (2022.01)

(56) References Cited

U.S. PATENT DOCUMENTS

| | | | |
|---|---|---|---|
| 2003/0133411 A1* | 7/2003 | Ise | H04L 47/724 370/230 |
| 2003/0137983 A1* | 7/2003 | Song | H04L 47/826 370/395.4 |
| 2006/0056302 A1 | 3/2006 | Ahn et al. | |
| 2006/0137002 A1* | 6/2006 | Forrester | H04L 67/327 726/11 |
| 2010/0080228 A1* | 4/2010 | Kwapniewski | H04L 45/00 370/392 |
| 2011/0228696 A1* | 9/2011 | Agarwal | H04L 41/12 370/253 |
| 2011/0283140 A1* | 11/2011 | Stevens | H04L 43/50 714/27 |
| 2012/0027016 A1* | 2/2012 | Filsfils | H04L 45/30 370/392 |
| 2012/0281528 A1 | 11/2012 | Hong et al. | |
| 2013/0094504 A1* | 4/2013 | Koteeswara | H04L 45/64 370/389 |
| 2014/0119189 A1* | 5/2014 | Lin | H04L 47/10 370/235 |
| 2014/0133396 A1* | 5/2014 | Liu | H04L 61/2007 370/328 |
| 2015/0098356 A1 | 4/2015 | Bhattacharya | |
| 2015/0222479 A1* | 8/2015 | Kim | H04W 28/0236 370/218 |
| 2016/0050141 A1* | 2/2016 | Wu | H04L 41/5054 370/389 |
| 2016/0142293 A1* | 5/2016 | Hu | H04L 45/745 370/392 |
| 2016/0157000 A1* | 6/2016 | Bai | H04L 29/06 398/45 |
| 2016/0212050 A1* | 7/2016 | Yin | H04L 45/08 |
| 2017/0041227 A1* | 2/2017 | Zhou | H04L 61/2007 |
| 2017/0078175 A1* | 3/2017 | Xu | H04L 43/0811 |
| 2017/0155582 A1* | 6/2017 | Xu | H04L 45/306 |
| 2017/0199770 A1* | 7/2017 | Peteva | G06F 9/5088 |
| 2017/0264677 A1* | 9/2017 | Li | H04L 41/50 |
| 2017/0302546 A1* | 10/2017 | Zheng | H04L 43/0811 |
| 2017/0359844 A1* | 12/2017 | Shuai | H04W 76/11 |
| 2018/0091420 A1* | 3/2018 | Drake | H04L 67/327 |
| 2018/0131590 A1* | 5/2018 | Penno | H04L 43/10 |
| 2018/0131599 A1* | 5/2018 | Dimitriadis | H04L 45/28 |
| 2018/0159759 A1* | 6/2018 | Liang | H04L 45/02 |
| 2018/0159765 A1* | 6/2018 | Shi | H04L 45/24 |
| 2018/0198643 A1* | 7/2018 | Ao | H04L 12/46 |
| 2018/0254960 A1* | 9/2018 | Ren | H04L 67/1031 |
| 2018/0302371 A1* | 10/2018 | Xie | H04L 29/08 |
| 2018/0329733 A1* | 11/2018 | Aronov | G06F 9/5027 |
| 2018/0343192 A1* | 11/2018 | Antonyraj | H04L 67/327 |
| 2019/0149469 A1* | 5/2019 | Surcouf | H04L 45/745 370/392 |
| 2019/0273727 A1* | 9/2019 | Eckert | H04L 63/1466 |
| 2019/0305987 A1* | 10/2019 | Wu | H04L 12/4633 |
| 2020/0169502 A1* | 5/2020 | Li | H04L 45/68 |
| 2020/0314111 A1* | 10/2020 | Fu | H04L 63/062 |
| 2021/0014158 A1* | 1/2021 | Zhang | H04L 47/2425 |
| 2021/0029023 A1* | 1/2021 | Zhang | H04L 45/02 |
| 2021/0075714 A1* | 3/2021 | Zhang | H04L 43/10 |

FOREIGN PATENT DOCUMENTS

| | | | | |
|---|---|---|---|---|
| CN | 102170371 A | | 8/2011 | |
| CN | 103379526 A | | 10/2013 | |
| EP | 2405608 A1 | * | 1/2012 | ......... H04L 41/0213 |
| EP | 2405608 A1 | | 1/2012 | |
| EP | 2060065 B1 | | 12/2018 | |
| WO | WO-2016107444 A1 | * | 7/2016 | .......... H04L 43/0811 |

OTHER PUBLICATIONS

Behringer, M. et al., "A Reference Model for Autonomic Networking draft-ietf-anima-reference-model-05," ANIMA, Internet Draft, Intended Status: Informational, Expires: Apr. 22, 2018, Oct. 19, 2017, 29 pages.
Bormann, C. , "A Generic Autonomic Signaling Protocol (GRASP) draft-ietf-anima-grasp-15," Network Working Group, Internet-Draft, Intended Status: Standards Track, Expires: Jan. 8, 2018, Jul. 7, 2017, 81 pages.
Brockners, F , "Data Fields for In-situ OAM draft-ietf-ippm-ioam-data-01," ippm, Internet-Draft, Intended Status Standards Track, Expires: May 3, 2018, Oct. 30, 2017, 29 pages.
Eckert, T. et al., "An Autonomic Control Plane (ACP) draft-ietf-anima-autonomic-control-plane-13," Anima WG, Internet-Draft, Intended Status: Standards Track, Expires: Jun. 20, 2018, Dec. 17, 2017, 109 pages.
Jiang, S. et al., "General Gap Analysis for Autonomic Networking," Internet Research Task Force (IRTF); Request for Comments: 7576, Category: Informational, ISSN: 2070-1721, Jun. 2015, 17 pages.
Kephart, J.O et al., "The Vision of Autonomic Computing," IEEE Computer Society, vol. 36, Issue: 1, Jan. 2003, 10 pages.
Pritikin, M. et al., "Bootstrapping Remote Secure Key Infrastructures (BRSKI) draft-ietf-anima-bootstrapping-keyinfra-09," ANIMA WG, Internet-Draft, Intended Status: Standards Track, Expires: May 3, 2018, Oct. 30, 2017, 59 pages.
Watsen, K. et al., "Voucher Profile for Bootstrapping Protocols draft-ietf-anima-voucher-06," ANIMA Working Group, Internet-Draft, Intended Status: Standards Track, Expires: Apr. 28, 2018, Oct. 25, 2017, 19 pages.
Yergeau, F., "UTF-8, A Transformation Format of ISO 10646," Network Working Group, Request for Comments: 3629, STD: 63, Obsoletes: 2279, Category: Standards Track, Nov. 2003, 14 pages.
Behringer, M., et al., "An Autonomic Control Plane (ACP), draft-ietf-anima-autonomic-control-plane-12", ANIMA WG, Internet-Draft, Intended status: Standards Track, Expires: Apr. 15, 2018, Oct. 12, 2017, 106 Pages.
Bormann, C., et al., "A Generic Autonomic Signaling Protocol (GRASP) draft-ietf-anima-grasp-14", Network Working Group, Internet-Draft, Intended status: Standards Track, Expires: Jan. 3, 2018, Jul. 2, 2017, 79 Pages.
Duan, F., et al., "Anima Bootstrapping for Network Management draft-nmdt-anima-management-bootstrap-00", Network Working Group, Internet-Draft, Intended status: Standards Track, Jul. 3, 2017, 11 Pages.

* cited by examiner

NETWORK DEVICE MANAGEMENT METHOD AND APPARATUS, AND SYSTEM
FOR INDICATING A NETWORK DEVICE TO
PERFORM MANAGEMENT OPERATION

CROSS-REFERENCE TO RELATED
APPLICATIONS

This application is a continuation of International Application No. PCT/CN2019/078537, filed on Mar. 18, 2019, which claims priority to Chinese Patent Application No. 201810277234.9, filed on Mar. 30, 2018. The disclosures of the aforementioned applications are hereby incorporated by reference in their entireties.

TECHNICAL FIELD

This application relates to the communications field, and in particular, to a network device management method and apparatus, and a system.

BACKGROUND

Autonomic networking is a network that includes a plurality of network devices and provides functions such as self-configuration, self-optimization, self-recovery, and self-protection.

In a related technology, after autonomic networking is deployed, a network management system (NMS) is usually used to manage and maintain the network devices. To be specific, the NMS needs to first establish a communication connection to each network device in the autonomic networking through a northbound interface, and the NMS may indicate, through the northbound interface, each network device to perform a related management operation, to obtain related information reported by each network device, so as to manage each network device.

However, the management method in the related technology is highly dependent on the NMS, and application flexibility is relatively poor. In addition, because the northbound interface needs to be deployed both on the NMS and each network device, costs of the management method are increased.

SUMMARY

This application provides a network device management method and apparatus, and a system, to resolve a problem in a related technology that a management method is relatively costly and has relatively poor application flexibility. The technical solutions are as follows:

According to a first aspect, a network device management method is provided and may be applied to a first network device in autonomic networking. The method may include: obtaining management information of a service flow, where the management information includes a type of a management operation and an identifier of the service flow, and the first network device is an ingress network device of the service flow; determining a second network device on a forwarding path of the service flow based on the identifier of the service flow, where the second network device is a next-hop network device of the first network device; sending a control packet to the second network device, where the control packet includes the management information, the second network device may forward the control packet hop by hop to each network device on the forwarding path, and the control packet is used to indicate the second network device to perform a management operation and obtain information associated with the management operation; and then receiving, by the first network device, a response packet from the second network device, where the response packet includes the information that is obtained by the second network device and that is associated with the management operation.

According to the network device management method provided in this application, the ingress network device of the service flow may be used to manage the second network device on the forwarding path of the service flow. This management method eliminates dependence on an NMS, effectively reduces management costs of the network device, and improves management flexibility of the network device.

Optionally, the first network device may include a control plane and a service plane. Correspondingly, the sending, by the first network device, a control packet to the second network device includes: sending the control packet to the second network device by using the service plane; and the receiving, by the second network device, a response packet from the second network device includes: receiving the response packet from the second network device by using the control plane.

Because the control plane is a plane independent of the service plane, and a control plane of each network device in the autonomic networking has full connectivity, the response packet can be normally sent and received regardless of whether a service plane of the second network device is faulty, to ensure that the first network device can analyze and locate a fault of the second network device in time.

Optionally, the control packet may further include a task identifier and an identifier of the ingress network device of the service flow, the identifier of the ingress network device is an identifier of the first network device, and the task identifier is a unique identifier allocated by the first network device to the management operation of the service flow.

The response packet reported by the second network device may also include the task identifier. Therefore, the first network device may determine, based on the task identifier in the response packet, a management operation of a service flow corresponding to the response packet, and present the management operation, so that an administrator can accurately learn of information corresponding to management operations of different service flows.

Optionally, the control packet may further include an identifier of a current network device, the identifier of the current network device is used to indicate a network device that currently sends the control packet, and for the control packet sent by the first network device, the identifier of the current network device is an identifier of the first network device.

A network device that receives the control packet may determine the identifier of the current network device as an identifier of a previous-hop network device of the current network device, and report the response packet including the identifier to the first network device. Further, the first network device may identify, based on an identifier of a previous-hop network device of each network device, the forwarding path of the service flow and a network device included in the forwarding path, to implement a visual representation of the forwarding path.

Optionally, the control packet may further include a type of to-be-obtained information.

Correspondingly, the control packet is used to indicate the second network device to perform a management operation based on the type of the management operation and obtain information indicated by the type of the to-be-obtained information.

The type of the to-be-obtained information is used to indicate the second network device to obtain information of a corresponding type. This effectively improves management flexibility.

Optionally, a plurality of functional modules configured to perform different operations may be deployed in each network device in the autonomic networking, and the control packet may further include an object name of a functional module configured to perform the management operation.

Correspondingly, the control packet may be used to indicate the second network device to perform the management operation by using the functional module indicated by the object name, and obtain the information associated with the management operation.

For different types of management operations, a corresponding functional module is indicated by using an object name to perform the management operation, and associated information is obtained. This improves accuracy of managing the network device.

Optionally, the control packet may further include control information, and the control information may include at least one type of first forwarding control information and second forwarding control information.

The first forwarding control information is used to: when the second network device does not support the management operation, indicate the second network device to forward the control packet or stop forwarding the control packet.

The second forwarding control information is used to: when there are at least two next-hop network devices of the second network device, indicate the second network device to forward the control packet to one of the next-hop network devices, or forward the control packet to each of the next-hop network devices of the second network device.

The control information is encapsulated in the control packet, so that the second network device can be flexibly controlled, and flexibility of network device management is improved.

Optionally, the control packet may be a generic autonomic signaling protocol (GRASP) request message, and the GRASP request message may include a message type field, a task identifier field, and a management object field.

The message type field is used to indicate a message type of the control packet.

The task identifier field is used to carry the task identifier.

The management object field is used to carry at least one of the type of the management operation, the identifier of the service flow, the identifier of the ingress network device, the object name, the type of the to-be-obtained information, and the control information.

Further, the management object field may include an object name field and an object information field.

The object name field is used to carry the object name.

The object information field includes: an ingress network device identifier field, a current network device identifier field, a forwarding path information field, a control information field, an operation type field, and a management information field.

The ingress network device identifier field is used to carry the identifier of the ingress network device; the current network device identifier field is used to carry an identifier of the network device that currently forwards the control packet; the forwarding path information field includes a path type field and a key field, where the path type field is used to carry a type of the forwarding path, and the key field is used to carry the identifier of the service flow; the control information field is used to carry the control information; the operation type field is used to carry the type of the management operation; and the management information field is used to carry the type of the to-be-obtained information.

Optionally, the response packet reported by the second network device may further include an identifier of the second network device and an identifier of a previous-hop network device of the second network device, and the method further includes:

determining, by the first network device based on the identifier of the second network device and the identifier of the previous-hop network device of the second network device (namely, the identifier of the first network device), a network device included in the forwarding path of the service flow, to identify the forwarding path of the service flow.

Optionally, the forwarding path of the service flow may further include a downstream network device located downstream of the second network device, and the method may further include:

receiving a response packet, from the downstream network device, forwarded by the second network device, where the response packet from the downstream network device may include: an identifier of the downstream network device and an identifier of a previous-hop network device of the downstream network device; and correspondingly, a process in which the first network device determines the network device included in the forwarding path of the service flow may include:

determining, based on the identifier of the second network device, the identifier of the previous-hop network device of the second network device, the identifier of the downstream network device, and the identifier of the previous-hop network device of the downstream network device, the forwarding path of the service flow and the network device included in the forwarding path, to implement a visual representation of the forwarding path, and further improve flexibility of subsequently managing the network device on the forwarding path.

Optionally, before the sending, by the first network device to the second network device, a control packet encapsulated with the management information, the method further includes:

determining a forwarding model of the service flow based on the identifier of the service flow; and encapsulating the management information by using the forwarding model, to obtain the control packet.

According to the management method provided in this application, the first network device may encapsulate the control packet by using a forwarding model that is the same as that of the service packet, and may forward the control packet in an out-of-band manner. This can avoid impact on a service packet of an actual service flow.

According to a second aspect, a network device management method is provided and may be applied to a second network device in autonomic networking. The method may include: receiving a control packet from a first network device, where the control packet includes management information of a service flow, the management information includes a type of a management operation and an identifier of the service flow, and the first network device is an ingress network device of the service flow; performing a management operation based on the type of the management operation, and obtaining information associated with the management operation; and sending a response packet to the first network device, where the response packet includes the information associated with the management operation.

According to the network device management method provided in this application, the second network device may be indicated by the control packet sent by the first network device to perform, the management operation, and report the obtained information associated with the management operation to the first network device by using the response packet. In this way, the first network device can manage the second network device on the forwarding path, and the method eliminates dependence on an NMS, reduces management costs of the network device, and improves management flexibility of the network device.

Optionally, the control packet may further include an identifier of a current network device, the identifier of the current network device is used to indicate a network device that sends the control packet, and the network device that sends the control packet is a network device located at a previous hop of the second network device on a forwarding path of the service flow;

after the receiving a control packet from a first network device, the method may further include:

determining, based on the identifier of the current network device, that an identifier of the previous-hop network device of the second network device is the identifier of the current network device, in other words, determining the identifier of the current network device as the identifier of the previous-hop network device; and correspondingly, the response packet further includes an identifier of the second network device and the identifier of the previous-hop network device of the second network device.

After receiving the response packet, the first network device may identify, based on the identifier of the second network device and the identifier of the previous-hop network device of the second network device, the forwarding path of the service flow and a network device included in the forwarding path, to implement a visual representation of the forwarding path.

Optionally, the second network device may include a control plane and a service plane. Correspondingly, a process of receiving the control packet from the first network device may include: receiving the control packet from the first network device by using the service plane, and sending the control packet to the control plane.

A process of performing the management operation based on the type of the management operation and obtaining the information associated with the management operation may include: performing the management operation by using the control plane, and obtaining the information associated with the management operation.

A process of sending the response packet to the first network device may include: sending the response packet to the first network device by using the control plane.

Because the control plane is a plane independent of the service plane, and a control plane of each network device in the autonomic networking has full connectivity, the response packet can be normally sent and received regardless of whether a service plane of the second network device is faulty, to ensure that the first network device can analyze and locate a fault of the second network device in time.

Optionally, the method may further include:

determining, based on the identifier of the service flow, a network device located at a next hop of the second network device on the forwarding path of the service flow; and forwarding the control packet to the next-hop network device of the second network device.

The second network device forwards the control packet to the next-hop network device, so that hop-by-hop forwarding of the control packet on the forwarding path can be implemented, and further each network device on the forwarding path can receive the control packet and perform a corresponding management operation. In this way, the first network device can manage each network device on the forwarding path of the service flow.

Optionally, a process of forwarding, by the second network device, the control packet to the next-hop network device of the second network device may include:

updating the identifier of the current network device in the control packet by using the identifier of the second network device; and forwarding updated control packet to the next-hop network device of the second network device.

The second network device updates the identifier of the current network device in the control packet and then forwards the control packet, so that it can be ensured that the next-hop network device can accurately determine the identifier of the previous-hop network device of the current network device based on the identifier of the current network device in the control packet.

Optionally, the control packet may further include a type of to-be-obtained information; and correspondingly, the obtaining information associated with the management operation may include:

obtaining information indicated by the type of the to-be-obtained information.

The type of the to-be-obtained information is used to indicate the second network device to obtain information of a corresponding type. This effectively improves management flexibility.

Optionally, the control packet may further include control information, and the control information includes at least one type of first forwarding control information and second forwarding control information, where when the control information includes the first forwarding control information, a process of forwarding the control packet to the next-hop network device of the second network device may include:

when the second network device does not support the management operation, if the first forwarding control information is preset control information, forwarding the control packet to the next-hop network device; or when the control information includes the second forwarding control information, a process of forwarding the control packet to the next-hop network device of the second network device may include:

when there are at least two next-hop network devices of the second network device, if the second forwarding control information is first control information, determining a target network device from the at least two next-hop network devices, and forwarding the control packet to the target network device; or if the second forwarding control information is second control information, forwarding the control packet to each of the next-hop network devices.

The control information encapsulated in the control packet is used to control a manner of forwarding the control packet by the second network device, so that the second network device can be flexibly controlled, and flexibility of network device management is improved.

Optionally, the control packet may further include a task identifier and an identifier of the ingress network device of the service flow, where the identifier of the ingress network device is an identifier of the first network device, and the task identifier is an identifier allocated by the first network device to the management operation of the service flow; and the response packet may further include the task identifier.

The response packet includes the task identifier. Therefore, the first network device may determine, based on the task identifier in the response packet, a management operation of a service flow corresponding to the response packet, and present the management operation, so that an administrator can accurately learn of information corresponding to management operations of different service flows.

Optionally, the control packet may be a GRASP response message, and the GRASP response message may include a message type field, a task identifier field, and a management object field.

The message type field is used to indicate a message type of the response packet.

The task identifier field is used to carry the task identifier.

The management object field is used to carry the information that is obtained by the second network device and that is associated with the management operation.

Further, the management object field may include an object name field and an object information field.

The object name field is used to carry the object name.

The object information field includes: an ingress network device identifier field, an upstream network device identifier field, a current network device identifier field, a role identifier field, a forwarding path information field, a management information field, and an information field.

The ingress network device identifier field is used to carry the identifier of the ingress network device of the service flow; the upstream network device identifier field is used to carry the identifier of the previous-hop network device of the second network device; the current network device identifier field is used to carry the identifier of the current network device, namely, the identifier of the second network device; the role identifier field is used to carry a role of the second network device on the forwarding path of the service flow; the forwarding path information field includes a path type field, a path status field, and a key field, where the path type field is used to carry a type of the forwarding path, the path status field is used to carry a path status of the forwarding path, and the key field is used to carry the identifier of the service flow; the management information field is used to carry the type of the to-be-obtained information; and the information field is used to carry the information that is obtained by the second network device and that is associated with the management operation.

According to a third aspect, a network device management apparatus is provided and is applied to a first network device in autonomic networking. The apparatus may include at least one module, and the at least one module may be configured to implement the network device management method provided in the first aspect.

According to a fourth aspect, a network device management apparatus is provided and is applied to a second network device in autonomic networking. The apparatus may include at least one module, and the at least one module may be configured to implement the network device management method provided in the second aspect.

According to a fifth aspect, a network device is provided. The network device may include a memory, a processor, and a computer program that is stored in the memory and that can run on the processor. When executing the computer program, the processor implements the network device management method provided in the first aspect or implements the network device management method provided in the second aspect.

According to a sixth aspect, a network device is provided. The network device may include a main control board, and a switching board and at least one interface board that are separately connected to the main control board. The main control board, the at least one interface board, and the switching board may be configured to implement the network device management method provided in the first aspect, or may be configured to implement the network device management method provided in the second aspect.

According to a seventh aspect, a computer-readable storage medium is provided. The computer-readable storage medium stores an instruction. When the computer-readable storage medium runs on a computer, the computer is enabled to perform the network device management method provided in the first aspect or perform the network device management method provided in the second aspect.

According to an eighth aspect, a computer program product including an instruction is provided. When the computer program product runs on a computer, the computer is enabled to perform the network device management method provided in the first aspect or perform the network device management method provided in the second aspect.

According to a ninth aspect, a network device management system is provided and is applied to autonomic networking. The management system may include a first network device and a second network device.

The first network device may include the network device management apparatus provided in the third aspect, or may be the network device provided in the fifth aspect or the sixth aspect.

The second network device may include the network device management apparatus provided in the fourth aspect, or may be the network device provided in the fifth aspect or the sixth aspect.

Technical effects obtained in the third aspect to the ninth aspect of the embodiments of the present application are similar to technical effects obtained by using corresponding technical means in the first aspect and the second aspect. Details are not described herein again.

In conclusion, embodiments of the present application provide the network device management method and apparatus, and the system. After obtaining the management information of the service flow, the first network device in the autonomic networking may send the control packet to the next-hop second network device, where the control packet includes the management information, and the control packet is used to indicate the second network device to perform the management operation, obtain the information associated with the management operation, encapsulate the obtained information associated with the management operation in the response packet, and report the response packet to the first network device. In this way, the first network device can manage the second network device on the forwarding path. Because the management method may be triggered and implemented by the first network device, dependence on an NMS is eliminated, and management flexibility is improved. In addition, because no northbound interface needs to be deployed in each network device, management costs of the network device are effectively reduced.

DETAILED DESCRIPTION OF ILLUSTRATIVE EMBODIMENTS

The Internet Engineering Task Force (IETF) defines a concept of autonomic networking (which may also be referred to as autonomous networking) and a design objective of an autonomic networking integrated model and approach (ANIMA) in Request For Comments (RFC) numbered 7575, and preliminarily defines an ANIMA reference model.

Figure 1:
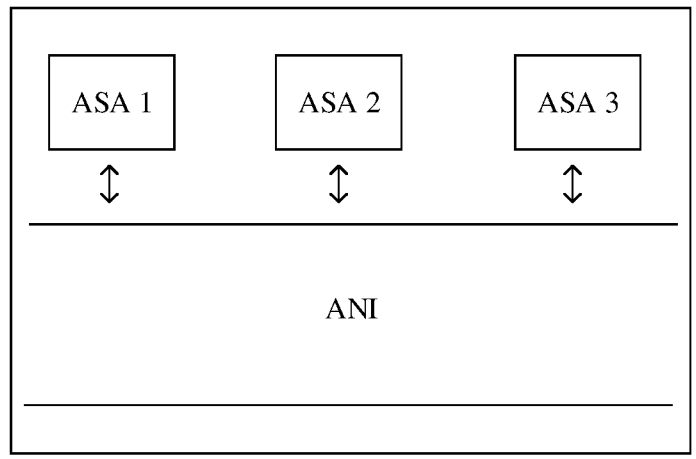
FIG. 1 is an architectural diagram of an autonomic node that uses an ANIMA reference model according to an embodiment of the present application.

Referring to FIG. 1, a network device using the ANIMA reference model, also referred to as an autonomic node, may be divided into two parts: autonomic networking infrastructure (ANI) module and an autonomic service agent (ASA) module. The ANI is a basic framework platform of the ANIMA, and can provide an independent and stable management plane for an autonomic node. The ANI mainly includes three core components: bootstrapping remote secure key infrastructures (BRSKI), an autonomic control plane (ACP), and a GRASP module. The ACP can automatically allocate an address to an autonomic node that newly joins an ANIMA domain, and establish a hop-by-hop security tunnel with an adjacent autonomic node, so that full connectivity of routes of all autonomic nodes in the ANIMA domain can be implemented. The ASA is a functional module (which may also be referred to as a service instance) that is configured to implement an autonomic function and that is in an autonomic node. The autonomic function may include a query function, a subscription function, and the like. A plurality of ASAs for implementing different functions can be deployed in each autonomic node. For example, three ASAs in total, namely, an ASA 1 to an ASA 3, are deployed in an autonomic node shown in FIG. 1.

After obtaining a domain certificate delivered by a controller of autonomic networking, the autonomic node may join the autonomic networking (also referred to as the ANIMA domain). The autonomic node joining the ANIMA domain may also be referred to as an ACP node. The ACP node may include a control plane and a service plane (Data plane).

The control plane is also referred to as an ACP virtual routing forwarding (VRF) module. The ACP VRF module may be understood as a virtual routing instance of autonomic networking, and includes an independent routing protocol, an access interface, and a routing table. Therefore, the ACP VRF module may be equivalent to an independent virtual router. The control plane includes a virtual out-of-band channel (VOOB), and can be used to implement a network management task. The service plane is a common service plane, and can be used to forward a service packet.

Because the control plane (namely, the ACP VRF module) has an independent forwarding plane, connectivity of the control plane does not depend on the service plane. Connectivity of the ACP VRF is not affected regardless of whether the service plane has a route and which forwarding model is used. Isolation of the ACP VRF is high. In addition, as long as the ACP node is located in the ANIMA domain, the ACP VRF always exists and is not affected by a configuration and running status of the service plane. Therefore, stability of the ACP VRF is high. In addition, the ACP VRF may further implement data exchange between any two ACP nodes in the ANIMA domain by using routing protocol for low power and lossy networks (Routing Protocol for LLN, RPL). In other words, the ACP VRF has full connectivity in the ANIMA domain. Further, the ACP VRF uses the GRASP as a unified communications protocol, has rich basic communication capabilities, has relatively high scalability, and can carry data of various types. Further, because the ACP nodes may communicate with each other through an ACP security tunnel after secure bootstrapping of the BRSKI, communication security between the ACP nodes is relatively high. In addition, inside a same ACP node, the ACP VRF and the service plane can securely access all data of each other.

Figure 2:
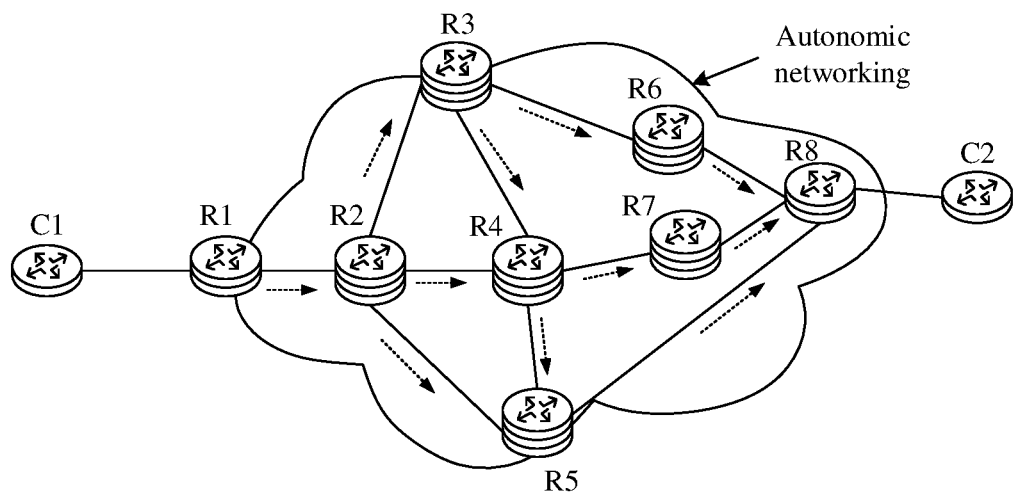
FIG. 2 is a schematic diagram of autonomic networking according to an embodiment of the present application.

FIG. 2 is a schematic structural diagram of autonomic networking according to an embodiment of the present application. As shown in FIG. 2, the autonomic networking may include a plurality of network devices, and each network device is an autonomic node. Each network device may be a terminal host (for example, a server or a computer terminal), or may be an intermediate forwarding device (for example, a router or a switch), or the like. A type of the network device is not limited in the embodiments of the present application. Each network device in the autonomic networking is a device that obtains the domain certificate of the ANIMA domain, and completes bootstrapping of the BRSKI and ACP security tunnel establishment. In other words, each network device has successfully joined the ANIMA domain. For example, as shown in FIG. 2, the autonomic networking may include eight network devices from R1 to R8, and network devices C1 and C2 are devices outside the ANIMA domain. According to the management method provided in the embodiments of the present application, an ingress network device of each service flow in the autonomic networking may manage another network device on a forwarding path of the service flow. This effectively improves flexibility of network device management.

Figure 3:
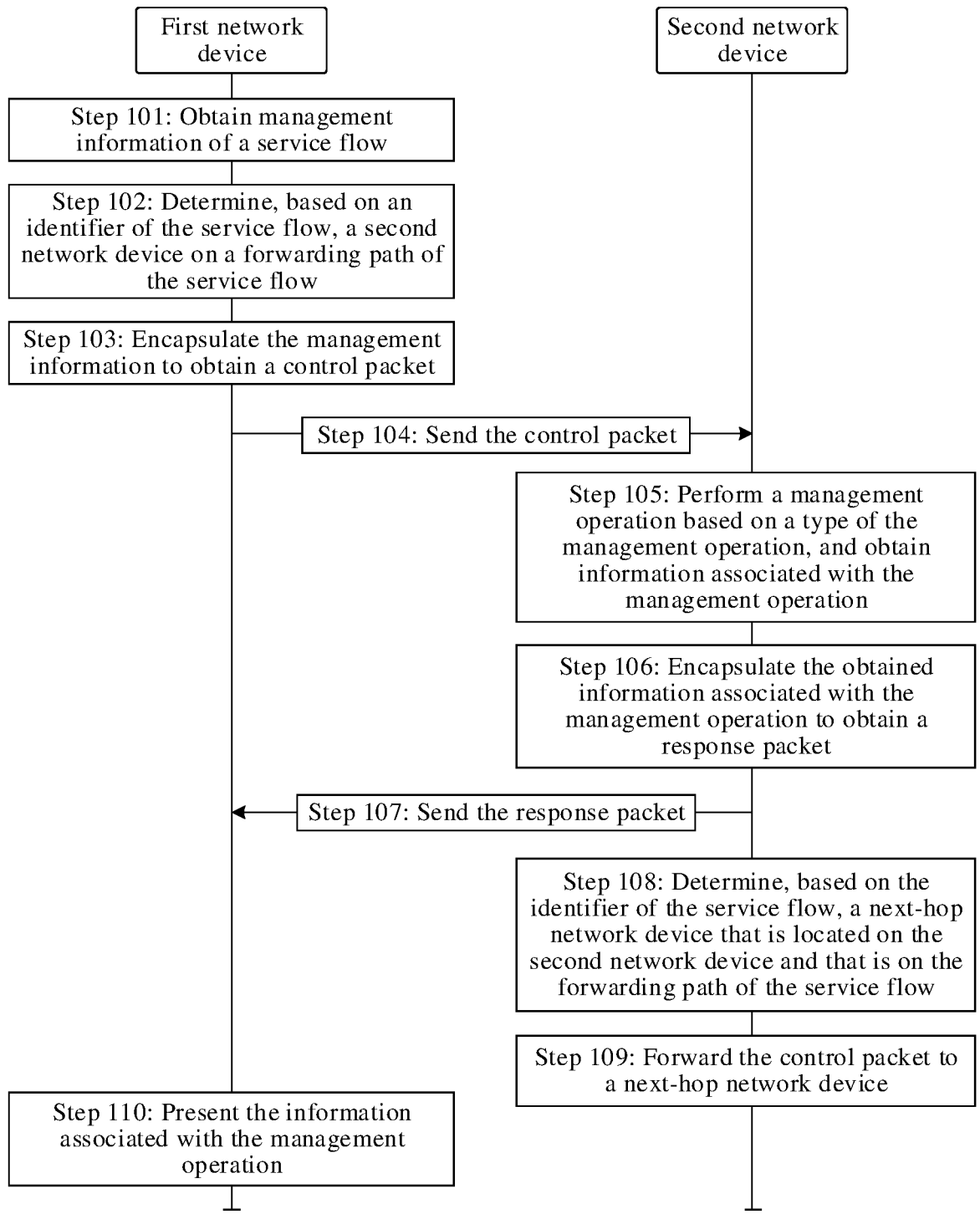
FIG. 3 is a flowchart of a network device management method according to an embodiment of the present application.

FIG. 3 is a flowchart of a network device management method according to an embodiment of the present application. The method may be applied to the autonomic networking shown in FIG. 2. Referring to FIG. 3, the method may include the following steps.

Step 101: A first network device obtains management information of a service flow.

The first network device is an ingress network device of the service flow, and may also be referred to as an ingress node. In this embodiment of the present application, when a network device on a forwarding path of a specific service flow needs to be managed, an administrator may determine an ingress network device (namely, the first network device) of the service flow, and may send management information to the first network device by using an NMS. Alternatively, an administrator may remotely log in to the first network device by using a remote terminal through an operation and maintenance (OM) interface provided by the first network device, and then, the administrator may input management information of the service flow to the first network device in a command line manner. The management information may include at least a type of a management operation and an identifier of the service flow.

The type of the management operation may include at least one of a query operation, a subscription (subscribe) operation, an un-subscription (unsubscribe) operation, and a re-subscription (re-subscribe) operation. The query operation is used to query related information of the network device on the forwarding path, the subscription operation is used to subscribe to related information of the network device on the forwarding path, the un-subscription operation is used to unsubscribe to related information of the network device, and the re-subscription operation is used to: when the first network device detects that a status of the forwarding path of the service flow changes (for example, a specific network device exits an ANIMA domain), re-obtain related information of the network device on the forwarding path. The related information of the network device may include a forwarding entry of the network device, a path status of a downstream path, a status of the network device, and the like. This is not limited in this embodiment of the present application.

The identifier of the service flow may be an identifier that can uniquely identify the service flow. A type of the identifier of the service flow may also differ according to a different type of the autonomic networking. For example, when the autonomic networking belongs to a public network, the identifier of the service flow may be a destination internet protocol (IP) address of the service flow. When the autonomic networking belongs to a virtual private network (VPN), namely, a private network, the identifier of the service flow may include a destination IP address and a VPN instance identifier of the service flow.

For example, it is assumed that in the autonomic networking shown in FIG. 2, a forwarding path of a specific service flow is shown by a dashed line arrow in FIG. 2. It can be learned from FIG. 2 that an ingress network device of the service flow is R1, a target network device is R8, and transit network devices are R2 to R7. The target network device is a network device located at a destination point of the forwarding path, and the transit network device is a network device that is on the forwarding path and that is configured to connect the ingress network device and the target network device. When the administrator needs to manage a device on the forwarding path, the administrator may remotely log in to the first network device R1 through an OM interface provided by the first network device R1, and input management information of the service flow to the first network device R1 in a command line manner.

It should be noted that, in this embodiment of the present application, in addition to the type of the management operation and the identifier of the service flow, the management information obtained by the first network device R1 may further include first control information used to control an operation procedure and second control information used to indicate feedback information of each network device. The first control information may include: a quantity of sent control packets, an interval of sending a control packet, an operation timeout interval, some encapsulation parameters in a control packet (for example, a parameter carried in an encapsulation header of the control packet), and the like. The second control information may include: control information about a detail degree of the feedback information, control information about a type of information that needs to be carried in a response packet fed back by each network device, control information used to indicate whether error information or logging information is carried, and the like. Content of information included in the management information may be flexibly set based on an actual requirement. This is not limited in this embodiment of the present application.

Step 102: The first network device determines, based on the identifier of the service flow, a second network device on a forwarding path of the service flow.

The second network device is a next-hop network device of the first network device on the forwarding path of the service flow. In this embodiment of the present application, after obtaining the management information, the first network device may obtain a forwarding entry from a locally stored forwarding database (FDB) based on the identifier of the service flow in the management information, and determine, based on the forwarding entry, the second network device on the forwarding path of the service flow.

Figure 4:
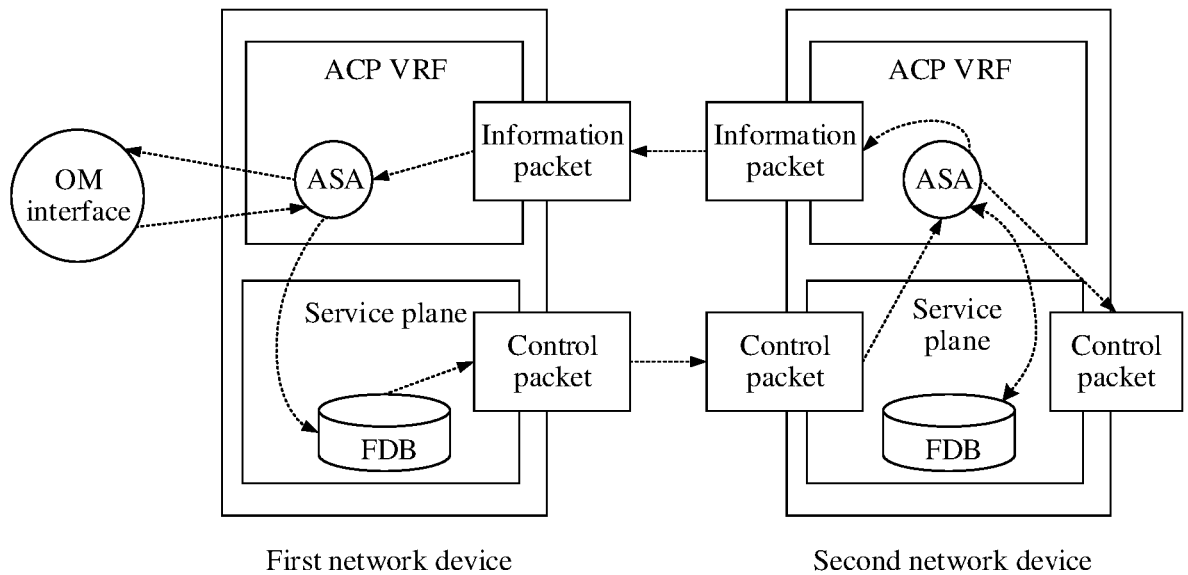
FIG. 4 is an architectural diagram of a network device management method according to an embodiment of the present application.

FIG. 4 is an architectural diagram of a network device management method according to an embodiment of the present application. Referring to FIG. 4, after the first network device obtains the management information, an ASA of the first network device may query path information of the service flow in an FDB of a service plane based on the identifier of the service flow in the management information, and the path information may include an identifier of the next-hop network device, or may further include an identifier of an outbound interface (namely, an outbound interface of the target network device), a label switching path (LSP) label stack, and other information.

For example, for the autonomic networking shown in FIG. 2, the first network device R1 may obtain, by querying the FDB of the service plane based on the identifier of the service flow, that the second network device on the forwarding path of the service flow is the network device R2.

Step 103: The first network device encapsulates the management information, to obtain a control packet.

In this embodiment of the present application, the first network device may encapsulate the management information according to a preset forwarding model, to obtain the control packet. Optionally, in step 102, when querying the FDB based on the identifier of the service flow to determine the second network device, the first network device may further determine a forwarding model of the service flow based on the identifier of the service flow. The forwarding model may generally include an IP model, a multi-protocol label switching (MPLS) model, or the like. The IP model may include a fourth version internet protocol (IPv4) model, a sixth version internet protocol (IPv6) model, and the like.

Further, the first network device may encapsulate the management information according to the determined forwarding model, to obtain the control packet. The control packet may be forwarded hop by hop to each network device on the forwarding path of the service flow. A network device that receives the control packet needs to perform a management operation indicated by the control packet, and reports information associated with the management operation to the first network device by using a response packet. In this way, the first network device can manage each network device on the forwarding path.

Optionally, in this embodiment of the present application, the control packet further includes a task identifier and an identifier of the ingress network device of the service flow, the identifier of the ingress network device is an identifier of the first network device, and the task identifier may be a unique identifier allocated by the first network device to the management operation of the service flow. For example, the task identifier may be a unique identifier randomly allocated by the first network device to the management operation of the service flow.

Further, the control packet may further include at least one of an identifier of a current network device, a type of to-be-obtained information, an object name of a functional module configured to perform the management operation, and control information.

The identifier of the current network device is used to indicate a network device that currently sends the control packet. Correspondingly, for the control packet sent by the first network device, the identifier of the current network device is the identifier of the first network device. The type of the to-be-obtained information may indicate a type of the information that needs to be obtained by the second network device and that is associated with the management operation. The object name may indicate the second network device to perform the management operation by using the functional module indicated by the object name. The control information may include at least one type of first forwarding control information and second forwarding control information, where the first forwarding control information is used to: when the second network device does not support the management operation (for example, the functional module indicated by the object name is not deployed in the second network device), indicate the second network device to continue to forward the control packet, or stop forwarding the control packet; and the second forwarding control information is used to: when there are at least two next-hop network devices of the second network device, indicate the second network device to forward the control packet to one of the next-hop network devices, or forward the control packet to each of the next-hop network devices of the second network device.

Figure 5:
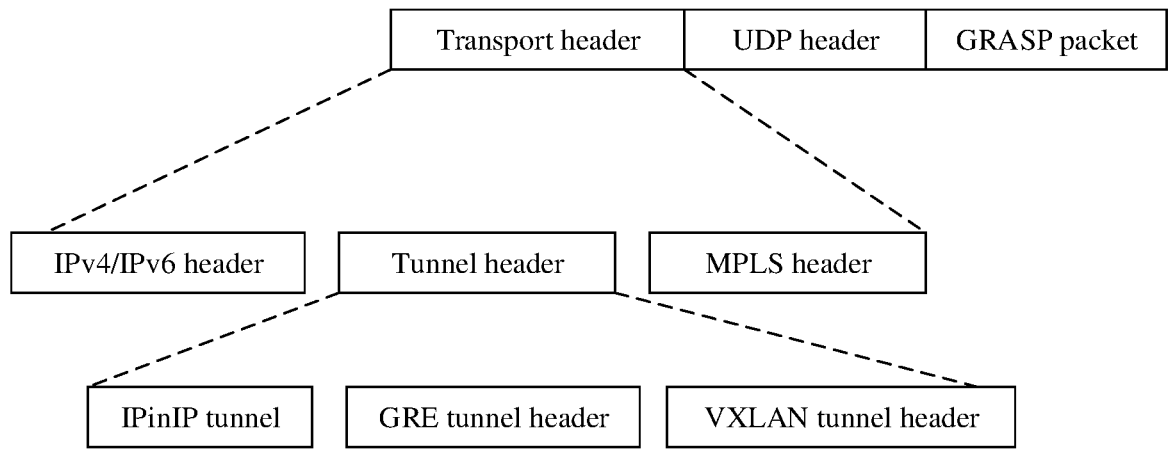
FIG. 5 is a schematic structural diagram of a control packet according to an embodiment of the present application.

FIG. 5 is a schematic structural diagram of a control packet according to an embodiment of the present application. As shown in FIG. 5, the control packet may be a GRASP request message, and the GRASP request message may include a transport header, a user datagram protocol (UDP) header, and a GRASP packet. The UDP header and the GRASP packet are valid payloads of the GRASP request message.

The GRASP request message may use different transport headers according to different forwarding models. For example, when the forwarding model is a native IP model, the transport header may be an IPv4 header or an IPv6 header. When the forwarding model is an IP tunnel model, the transport header may be a tunnel header, and the tunnel header may include an IPinIP (IP is encapsulated in IP) header, a generic routing encapsulation (GRE) header, or a virtual extensible local area network (Virtual Extensible LAN, VXLAN) tunnel header. When the forwarding model is an MPLS model, the transport header may be an MPLS header, and the MPLS header may include an MPLS label stack and an IP header.

The UDP header may include: DestPort=GRASP_LISTEN_PORT, SrcPort=<randomly allocated>. DestPort represents a UDP destination port number; GRASP_LISTEN_PORT represents a listening port number of a GRASP module; the listening port number is a well-known port number; and SrcPort is a source port number, and the source port number may be randomly allocated by the first network device. It can be learned from the UDP header that the UDP destination port number is the listening port number of the GRASP module. Therefore, a second network device that receives the control packet may distribute, according to the UDP destination port number, the control packet to the GRASP module for processing.

The GRASP packet may include: [message-type, session-id, objective].

The message-type is a message type field, and the field is used to indicate a message type of the control packet. For example, the control packet may use a GRASP synchronization mechanism. In other words, the control packet may be a GRASP synchronization request message. Correspondingly, the message-type may be set to M_REQ_SYN.

The session-id is a task identifier field, and the field is used to carry the task identifier allocated by the first network device to the management operation on the service flow. A response packet reported by the second network device after the second network device receives the control packet also includes the task identifier. The first network device may perform matching on the received response packet based on the task identifier, to determine a management operation of a service flow corresponding to each response packet.

The objective is a management object field, and the management object field is used to carry at least one of the type of the management operation, the identifier of the service flow, the identifier of the ingress network device, the object name, the type of the to-be-obtained information, and the control information. For example, the management object field may be defined as: objective=[objective-name, objective-flags, loop-count, objective-value].

The objective-name is an object name field, and the object name field is used to carry an object name that can uniquely identify a functional module (namely, a management object) that is in the second network device and that is configured to perform the management operation. The object name may include a UTF-8 (a variable-length character encoding for a Unicode) character, and a character length of the object name is not limited in this embodiment of the present application. In addition, the object name may be classified into two types: a standard name and a private name. The standard name is uniformly allocated by the Internet Assigned Numbers Authority (IANA). The private name may be defined by an ASA in the network device, and the private name generally includes at least one character ":". For example, a private name of an ASA that can implement a subscription function in the network device may be "xxxx.com: PathStatusSubcribe".

The objective-flags is an object flag field, and the field is used to specify an operation type predefined by the GRASP, for example, may be set to F_SYNCH.

The loop-count is a loop count field, and this field may be used to avoid an infinite loop when the GRASP module performs an operation, for example, a discovery operation, a negotiation operation, or a flood operation.

The objective-value is an object information field, and the object information field may be defined as: objective-value= [ingress, current, path-info, control-flags, [op-type, timeout], [*[type, params]]].

The ingress is an ingress network device identifier field, the field is used to carry the identifier of the ingress network device (namely, the first network device) of the service flow, and the field may be defined as: ingress=[ingress-acp-ula, ingress-global-addr]. In other words, the identifier of the ingress network device may include a unique local address (ULA) of an ACP of the ingress network device and a global address of the ingress network device, and the global address is a management address of a service plane of the ingress network device.

The current is a current network device identifier field, and the field is used to carry the identifier of the network device that currently sends the control packet. The field may be defined as: current=[current-acp-ula, current-global-addr]. In other words, the identifier of the current network device may include an ACP ULA of the current network device and a management address of a service plane of the current network device.

For example, it is assumed that the first network device is the network device R1 shown in FIG. 2, in the control packet sent by the first network device R1, both the ingress field and the current field carry an identifier of the first network device R1.

The path-info is a forwarding path information field, and the field is used to carry related information of the forwarding path of the service flow. The field may be defined as: path-info=[path-type, path-status, path-keys]. The path-type is a path type field, and the field is used to carry a type of the forwarding path. The type of the forwarding path varies with a forwarding model, and may generally include IPv4, IPv6, IPv4-VRF, IPv6-VRF, MPLS, or the like. The path-keys is a key field, and the field is used to carry the identifier of the service flow. A type of the identifier of the service flow carried in the key field varies with the type of the forwarding path. For example, for a forwarding path whose type is IPv4, an identifier of the service flow may be a destination IPv4 address of the forwarding path. For a forwarding path whose type is IPv4-VRF, an identifier of the service flow may be a destination IPv4 address and a VRF name of the forwarding path. The path-status is a path status field, and the field is used to carry a status of a forwarding path. In the control packet, the path-status field may be a preset initial value. After receiving the control packet, the second network device may update the path-status field by using the obtained path status. The path status may generally include: a continued state, a broken state, a terminated state, and the like.

For example, when the second network device that receives the control packet is not the target network device, and the next-hop network device is found, it may be determined that the path status is the continued state; when the second network device that receives the control packet is not the target network device, and the next-hop network device is not found, it may be determined that the path status is the broken state; or when the second network device that receives the control packet is the target network device, it may be determined that the path status is the terminated state. In addition, the path status may further include a sub-path (sub-branch) status, and the sub-path status may be used to indicate whether a downstream path of the second network device includes a plurality of sub-paths (in other words, whether there are a plurality of next-hop network devices). Correspondingly, when there are a plurality of sub-paths, the path status may further include a path status of each sub-path.

The control-flags is a control information field, the control information field may be used to carry the control information, and the control information may include at least one of first forwarding control information (CF_TRANSIT) and second forwarding control information (CF_ALL_SUB-PATH). The first forwarding control information is used to: when the second network device does not support the management operation, indicate the second network device to continue to forward the control packet, or stop forwarding the control packet; and the second forwarding control information is used to: when there are at least two next-hop network devices of the second network device, indicate the second network device to forward the control packet to one of the next-hop network devices, or forward the control packet to each of the next-hop network devices of the second network device.

The op-type is an operation type field, and the field is used to carry the type of the management operation. The type of the management operation may include a query operation, a subscription operation, an un-subscription operation, a re-subscription operation, and the like. In this embodiment of the present application, to ensure service security, for service data in the second network device, the first network device can perform only a read-only operation.

The timeout is a timeout interval field, and the field may be used to configure a timeout interval for the subscription operation, to prevent the subscription operation from indefinitely occupying related resources. For example, when the field is X, it may indicate that the subscription operation becomes invalid after X duration, and when the field is 0, it may indicate that there is no timeout limit.

The type is a management information field, and the field is used to carry the type of the to-be-obtained information. The params is an information field, and the field is used to carry the information associated with the management operation, namely, information indicated by the type of the to-be-obtained information. The *[type, params] represents that the type field and params field each may include a plurality of groups, and each group may record one type of the to-be-obtained information and the information indicated by the type.

In this embodiment of the present application, the administrator may self-define a type field corresponding to the objective-name based on the requirement. For example, if the forwarding path of the service flow needs to be identified, the first network device may query a previous-hop network device of each network device on the forwarding path. Correspondingly, the type of the to-be-obtained information carried in the type field may include an input interface name of the control packet, an IP address of an input interface of the control packet, or the like.

It should be noted that each field of a valid payload in the control packet may be selected based on an actual requirement. For example, for the query operation, the timeout field may not need to be set. Alternatively, the control-flags field may not need to be set in the control packet. Correspondingly, after receiving the control packet, the second network device may directly forward the control packet to each next-hop network device. A type of a field encapsulated in the control packet is not limited in this embodiment of the present application.

It should be further noted that, after receiving the control packet, each network device further needs to obtain management information encapsulated in the control packet in addition to normally forwarding the control packet, to perform the management operation. Therefore, when encapsulating the control packet, the first network device may further determine a corresponding hop-by-hop sending mechanism according to the forwarding model, and encapsulate, into the control packet, a related field used to indicate the network device that receives the control packet to send the control packet hop by hop. The related field varies with a different forwarding model. For example, the related field may be a time to live (TTL), a hop limit, a router alert, a label alert, a control word, or the like. The hop-by-hop sending means that after receiving the control packet by using the service plane, each network device sends the control packet to the control plane for processing, and then the control plane of the network device forwards the control packet to the next-hop network device.

Step 104: The first network device sends the control packet to the second network device.

Further, the first network device may send the control packet to the second network device by using the service plane, and the second network device may further forward the control packet to a downstream network device located downstream of the second network device, so that the control packet may be forwarded hop by hop to each network device on the forwarding path.

For example, for the autonomic networking shown in FIG. 2, the first network device R1 may send the control packet to the second network device R2 by using the service plane of the first network device R1.

In this embodiment of the present application, the control packet is encapsulated by using a forwarding model that is the same as that of the service packet, and is theoretically forwarded based on a forwarding path that is the same as that of the service packet. This implements simulation of the service packet. In addition, because the control packet is forwarded in an out-of-band manner, forwarding of a service packet of an actual service flow is not affected. In addition, because the control packet does not depend on the service packet, flexibility of generating and forwarding the control packet is higher.

Step S105: The second network device performs a management operation based on the type of the management operation and obtains information associated with the management operation.

After receiving the control packet from the first network device, the second network device may obtain the management information encapsulated in the control packet, perform the management operation based on the type of the management operation specified in the management information, and obtain the information associated with the management operation.

In the embodiments of the present application, a plurality of functional modules (namely, ASA) configured to perform different operations are deployed in each network device in the autonomic networking, and the control packet sent by the first network device may further include an object name (namely, the objective-name) of the functional module configured to perform the management operation and the type of the to-be-obtained information. Therefore, after receiving the control packet, the second network device may perform the management operation by using the functional module indicated by the object name. Correspondingly, when obtaining the information associated with the management operation, the second network device may obtain the information indicated by the type of the to-be-obtained information.

For example, referring to FIG. 4, the second network device R2 may receive, by using the service plane, the control packet sent by the first network device, and may send the control packet to the control plane, for example, may send the control packet to a host protocol stack running on the control plane. The host protocol stack may distribute the control packet to the GRASP module according to the UDP destination port number in the control packet, and then the GRASP module further distributes the control packet to an ASA indicated by the objective-name according to the objective-name in the control packet for processing. For example, if the management operation is the query operation, the ASA indicated by the objective-name is an ASA configured to implement the query function. After receiving the control packet distributed by the GRASP module, the ASA configured to implement the query function may perform the query operation and obtain the information indicated by the type of the to-be-obtained information.

In addition, if the second network device does not support the management operation, for example, the functional module indicated by the object name is not deployed in the second network device, the second network device may not need to perform the management operation. In addition, the second network device may further determine, based on the first forwarding control information encapsulated in the control packet, whether to continue to forward the control packet. For example, when the first forwarding control information in the control packet is preset control information (for example, 1), the second network device may continue to forward the control packet to a next-hop network device. In other words, the second network device may perform step 108 and step 109. When the first forwarding control information in the control packet is not preset control information (for example, the first forwarding control information is 0), the second network device may stop forwarding the control packet, and may discard the control packet. In other words, the second network device does not need to perform step 108 and step 109.

Step 106: The second network device encapsulates the obtained information associated with the management operation to obtain a response packet.

The second network device may encapsulate, according to a preset encapsulation model, the obtained information associated with the management operation, to obtain the response packet. In addition, the response packet may further include an identifier of the second network device and an identifier of a previous-hop network device of the second network device (namely, the identifier of the first network device), so that after obtaining a response packet reported by each network device, the first network device may obtain an identifier of each network device on the forwarding path, and an identifier of a previous-hop network device of each network device, to identify a forwarding path of the service flow and a network device included in the forwarding path.

Because the control packet received by the second network device further includes the identifier of the current network device, the second network device may directly determine the identifier of the current network device in the control packet as the identifier of the previous-hop network device. For example, the second network device may determine that the identifier carried in the current field in the control packet is the identifier of the previous-hop network device of the second network device. For the second network device, the identifier of the previous-hop network device of the second network device is the identifier of the first network device.

Optionally, as described in step 103, the control packet sent by the first network device may further include a task identifier and an identifier of the ingress network device of the service flow. Correspondingly, the response packet generated by the second network device may also include the task identifier and the identifier of the ingress network device, so that the first network device may identify, based on the task identifier, the management operation of the service flow corresponding to the response packet.

Figure 6:
FIG. 6 is a schematic structural diagram of a response packet according to an embodiment of the present application.

FIG. 6 is a schematic structural diagram of a response packet according to an embodiment of the present application. The response packet may be a GRASP response message. Referring to FIG. 6, the GRASP response message may include an IPv6 over the Internet Protocol Security (IPsec) header (namely, an IPv6 over IPsec header), a UDP header, and a GRASP packet. The UDP header and the GRASP packet form valid payloads of the response packet.

Because communication of an ACP VRF of each network device in the autonomic networking is performed based on a security tunnel established by the ACP, the IPv6 over IPsec header may be used. The security tunnel may be an IPsec tunnel, an IPsec with GRE tunnel (IPsec with GRE), or the like.

The UDP header may include: DestPort=GRASP_LISTEN_PORT, SrcPort=<random allocation>. DestPort represents a UDP destination port number; GRASP_LISTEN_PORT represents a listening port number of a GRASP module; the listening port number is a well-known port number; and SrcPort is a source port number, and the source port number may be randomly allocated. It can be learned from the UDP header that the UDP destination port number is the listening port number of the GRASP module. Therefore, the first network device that receives the response packet distribute, according to the UDP destination port number, the response packet to the GRASP module for processing.

The GRASP_Packet may include: [message type, session-id, objective].

The message-type is a message type field, and the field is used to indicate a message type of the response packet. For example, corresponding to the control packet, the response packet may also use a GRASP synchronization mechanism, in other words, the response packet may be a GRASP synchronization response message. Correspondingly, the message type may be set to M_SYNCH.

The session-id is a task identifier field, and the field is used to carry the task identifier. The task identifier may be obtained by the second network device by copying the received control packet.

The objective is a management object field, and the field is used to carry the information that is obtained by the second network device and that is associated with the management operation. For example, the management object field may be defined as: objective=[objective-name, objective-flags, loop-count, objective-value].

The objective-name is an object name field, and the field is used to carry the object name of the functional module that performs the management operation. The object name is the same as the object name encapsulated in the control packet received by the second network device.

The objective-flags is an object flag field, and the field is used to specify the operation type, and may be set to F_SYNCH.

The objective-value is an object information field, and the object information field may be defined as: objective-value= [ingress, upstream, current, role, path-info, [*[type, params]]].

The ingress is an ingress network device identifier field, and the field is used to carry the identifier of the ingress network device. This field may be defined as: ingress= [ingress-acp-ula, ingress-global-addr].

For example, for the autonomic networking shown in FIG. 2, in the response packet reported by the second network device R2, the ingress field may carry an ACP ULA of the first network device R1 and a management address of a service plane of the first network device R1.

The upstream is an upstream network device identifier field, and the field is used to carry the identifier of the previous-hop network device of the second network device. The field may be defined as: upstream=[upstream-acp-ula, upstream-global-addr]. It can be learned from the definition of the field that the identifier of the previous-hop network device may include an ACP ULA of the previous-hop network device and a management address of a service plane of the previous-hop network device.

For example, for the autonomic networking shown in FIG. 2, because the previous-hop network device of the second network device R2 is the first network device R1, in the response packet reported by the second network device R2 to the first network device R1, the upstream field may carry the ACP ULA of the first network device R1 and the management address of the service plane of the first network device R1.

The current is a current network device identifier field, and the field is used to carry the identifier of the current network device. The current may be defined as: current= [current-acp-ula, current-global-addr].

For example, in the response packet reported by the second network device R2 to the first network device R1, the current field may carry an ACP ULA of the second network device R2 and a management address of a service plane of the second network device R2.

The role is a role identifier field, and the field is used to carry a role of the second network device on the forwarding path of the service flow. The role of the second network device may be any one of a transit network device, a target network device, and an edge network device. After receiving the control packet, if the second network device finds a next-hop network device, and the next-hop network device belongs to the autonomic networking, it may be determined that the role of the second network device is the transit network device; if the second network device finds a next-hop network device, but the next-hop network device does not belong to the autonomic networking, it may be determined that the next-hop network device is the edge network device; and if the second network device does not find a next-hop network device, it may be determined that the role of the second network device is the target network device.

For example, for the autonomic networking shown in FIG. 2, if the second network device R2 finds that network devices at a next hop include R3, R4, and R5, and R3, R4, and R5 all belong to the autonomic networking, in the response packet reported by the second network device R2, the role carried in the role identifier field is the transit network device.

The path-info is a forwarding path information field, and the field is used to carry related information of the forwarding path of the service flow. A definition of the field may be the same as a definition of the forwarding path information field in the control packet. In addition, after receiving the control packet, the second network device may query a status of a corresponding forwarding path based on the path-type field and the path-keys field in the forwarding path information field in the control packet, and may update the path-status field in the path-info by using the status of the forwarding path that is obtained by querying.

The type is a management information field, and the field is used to carry the type of the to-be-obtained information. The params is an information field, and the field is used to carry the information that is obtained by the second network device and that is associated with the management operation.

For example, when a specific second network device finds that a forwarding path is interrupted (for example, a forwarding entry fails to be queried) when performing a management operation, the second network device may set a path-status field in a response packet fed back to the first network device to broken. In addition, a detailed cause of the forwarding entry query failure can be returned in the params field. In addition, because the forwarding path is interrupted, the second network device may stop forwarding the control packet.

Step 107: The second network device sends the response packet to the first network device.

In this embodiment of the present application, the second network device may send the response packet to the first network device by using a control plane of the second network device. Correspondingly, the first network device may receive, by using the control plane of the first network device, the response packet reported by the second network device. Because a control plane of each network device in the autonomic networking has full connectivity, regardless of whether the service plane of the second network device is faulty, it can be ensured that the response packet is sent to the first network device in time, so that the first network device can locate and analyze the service plane fault in time. This effectively improves reliability of network device management.

For example, for the autonomic networking shown in FIG. 2, the second network device R2 may send the generated response packet to the first network device R1 by using the control plane of the second network device R2.

It should be noted that, according to different types of management operations encapsulated in the control packet, the second network device sends the response packet on different occasions. For example, when the management operation is the query operation, after performing the query operation and obtaining information indicated by the query operation, the second network device may feed back, to the first network device in real time, a response packet in which the obtained information is encapsulated. In other words, the second network device may feed back, to the first network device at a time by using the response packet, information associated with the query operation.

When the management operation is the subscription operation, when detecting that information indicated by the subscription operation changes, the second network device may report, to the first network device, a response packet in which the information is encapsulated. Alternatively, the second network device may periodically query, based on a subscription period indicated by the subscription operation, information indicated by the subscription operation, and report, to the first network device, the response packet in which the information is encapsulated.

Step 108: The second network device determines, based on the identifier of the service flow, a network device located at a next hop of the second network device on the forwarding path of the service flow.

After receiving the control packet from the first network device, in addition to performing the management operation, the second network device may further determine, based on an identifier of the service flow encapsulated in the control packet, a next-hop network device of the second network device on the forwarding path of the service flow from a forwarding entry stored in a local FDB. Only an ACP VRF of a network device that belongs to the autonomic networking (in other words, joining the AINMA domain) can implement full connectivity. Therefore, when the second network device determines that there are no next-hop network devices (in other words, the second network device is a target network device of the service flow) on the forwarding path, or when the next-hop network device does not belong to the autonomic networking, the second network device may no longer forward the control packet. In other words, step 109 is not performed.

For example, referring to FIG. 4, an ASA that receives the control packet and that is in the second network device R2 may query the FDB of the service plane based on the identifier of the service flow, to determine the next-hop network device. For example, the second network device R2 may determine that next-hop network devices include R3, R4, and R5.

Step 109: The second network device forwards the control packet to the next-hop network device.

If the second network device finds, in step 108, the next-hop network device that belongs to the autonomic networking, the second network device may forward the control packet to the next-hop network device by using the control plane, so that the next-hop network device may continue to forward the control packet.

Further, if the second network device determines, in step 108, that there are at least two next-hop network devices, in other words, on the forwarding path of the service flow, an equal-cost multi-path routing (ECMP) exists on a downstream forwarding path of the second network device, the second network device may forward the control packet to each next-hop network device.

Alternatively, the second network device may determine a forwarding manner of the control packet based on the second forwarding control information encapsulated in the control packet. For example, if the second forwarding control information is first control information (for example, 0), the second network device may determine a target network device from the at least two next-hop network devices, and forward the control packet to the target network device; or if the second forwarding control information is second control information (for example, 1), the second control information may forward the control packet to each next-hop network device. The second network device may determine the target network device from the at least two next-hop network devices by using a hash algorithm. For example, the second network device may directly perform calculation (which is also referred to as a static hash algorithm) based on a related field in the control packet, to select the target network device, to ensure that load of sub-paths corresponding to the at least two next-hop network devices is relatively balanced.

For example, for the autonomic networking shown in FIG. 2, after receiving the control packet, the second network device R2 may determine, based on the identifier of the service flow, three next-hop network devices: R3, R4, and R5. If the second forwarding control information encapsulated in the control packet is 1, the second network device R2 may replicate the control packet, and separately forward the control packet to the network devices R3, R4, and R5.

Alternatively, it is assumed that in the autonomic networking shown in FIG. 2, a forwarding path of a specific service flow includes only two network devices: R6 and R8.

The network device R6 is an ingress network device, and the second network device R8 at a next hop of the network device R6 is a target network device. After the second network device R8 receives the control packet and because the second network device R8 is the target network device on the forwarding path of the service flow, and there are no next-hop network devices, the second network device R8 may stop forwarding the control packet, and may discard the control packet after obtaining the information encapsulated in the control packet.

It should be noted that, as described in step 103, the control packet sent by the first network device may further include the identifier of the current network device. Therefore, before forwarding the control packet, the second network device may further update the identifier of the current network device in the control packet by using the identifier of the second network device, and then forward an updated control packet to the next-hop network device, so that the next-hop network device can accurately obtain an identifier of the previous-hop network device.

For example, the current field in the control packet sent by the first network device R1 may carry an ACP ULA of the first network device R1 and a management address of the service plane of the first network device R1. After receiving the control packet, the second network device R2 may update the current field to an ACP ULA of the second network device R2 and a management address of the service plane of the second network device R2. Then, the second network device R2 may separately forward the updated control packet to the network devices R3, R4, and R5.

Further, when the forwarding path of the service flow further includes a downstream network device located downstream to the second network device, the second network device may further forward the control packet to the downstream network device hop by hop. Therefore, all network devices that belong to the autonomic networking and that are on the forwarding path may receive the control packet. Correspondingly, each network device that receives the control packet may perform a management operation based on a type of the management operation in the control packet, obtain information associated with the management operation, and report a response packet to the first network device. For an implementation process in which the downstream network device performs the management operation, obtains the information associated with the management operation, reports the response packet, and continues to forward the control packet, refer to related descriptions in step 105 to step 109. Details are not described herein again.

For example, for the autonomic networking shown in FIG. 2, on the forwarding path of the service flow that uses the first network device R1 as the ingress network device, the network devices R3 to R8 may receive the control packet from the first network device R1. In this case, the network devices R3 to R8 may separately perform a management operation, obtain information associated with the management operation, and separately send the generated response packet to the first network device R1.

It should be noted that, when the downstream network device located downstream to the second network device reports the response packet, because a previous-hop network device of the downstream network device is not the first network device, the downstream network device needs to report the response packet to the first network device in a hop-by-hop forwarding manner. In other words, the response packet sent by the downstream network device finally needs to be reported to the first network device by using the second network device.

It should be further noted that, in this embodiment of the present application, if a specific network device on the forwarding path finds that a next-hop network device exists on the forwarding path, but the next-hop network device does not belong to the autonomic networking, the network device may also be referred to as an edge network device or an edge node (Egress Node). The edge network device does not need to continue to forward the control packet. It can be learned that in this embodiment of the present application, on the forwarding path of the service flow, only the transit network device needs to continue to forward the control packet, and the target network device and the edge network device do not need to forward the control packet.

Step 110: The first network device presents the information associated with the management operation.

After receiving the response packet sent by the second network device and the response packet that is of the downstream network device of the second network device and that is forwarded by the second network device, the first network device may obtain information that is in each response packet and that is associated with the management operation, summarize the information, and may represent a summarized result to a remote terminal or an NMS through an OM interface, so that the administrator can learn of, in time, information obtained after each network device on the forwarding path performs the management operation.

For example, for a specified management operation of a specific service flow, the first network device may determine, from a plurality of received response packets based on a specified task identifier allocated to the specified management operation of the specified service flow, a response packet whose task identifier is the specified task identifier, and presents information in the determined response packet as information associated with the specified management operation. In this way, the administrator can accurately learn of information corresponding to management operations for different service flows.

In addition, because the response packet reported by the second network device further includes an identifier of the second network device and an identifier of the previous-hop network device of the second network device, the response packet reported by the downstream network device of the second network device further includes an identifier of the downstream network device and an identifier of the previous-hop network device of the downstream network device. Therefore, the first network device may further determine, based on the identifier of the first network device, the identifier of the second network device, the identifier of the previous-hop network device of the second network device, the identifier of each downstream network device, and the identifier of the previous-hop network device of each downstream network device, the forwarding path of the service flow and the network device included in the forwarding path, to implement a visual representation of the forwarding path, and further perform a specified management operation on a specified network device based on the determined forwarding path and the network device. This effectively improves management efficiency of the network device.

For example, the first network device may match fields such as session-id, ingress, and path-info in a response packet reported by each network device (including the second network device and the downstream network device), and determine that a plurality of response packets whose fields are the same are packets reported by a plurality of network devices on a same forwarding path. Further, a forwarding path in which the first network device is a root node and a network device on the forwarding path may be identified based on the identifier of the first network device, the identifier of the current network device in the plurality of response packets, and the identifier of the upstream network device.

It should be noted that, normally, each network device added to the ANIMA domain is represented as a host route in an RPL routing table, and a prefix of the host route is an ACP ULA of the network device. When the network device leaves the ANIMA domain, the RPL route is re-converged. When the network device on the forwarding path can normally return the response packet to the first network device, when summarizing the information about the forwarding path based on the response packet, the first network device may query the RPL routing table, to check a status of the forwarding path and a status of a specified network device.

When detecting that a path status of a forwarding path of a specific service flow changes (for example, a network device on the forwarding path exits the ANIMA domain), the first network device may encapsulate by using same fields such as session-id, ingress-acp-ula, path-type, and path-keys, to obtain a control packet, and re-collect and refresh information about the forwarding path by using the control packet. After the response packets fed back by all the network devices are collected and the information about the forwarding path is re-summarized, if an identifier of a previous-hop network device of a specific network device is not carried in the information about the forwarding path (in other words, the first network device does not receive the response packet sent by the previous-hop network device), the first network device may determine the network device as an "isolated" network device on the forwarding path. If the first network device has previously performed the subscription operation on the "isolated" network device, the first network device may send, to the first network device, a control packet used to indicate to cancel subscription (in other words, a type of management information encapsulated in the control packet is the un-subscription), to clear related subscription cache information in the network device. Certainly, if the first network device does not send the control packet used to indicate to cancel subscription, the subscription cache information of the network device may also be aged out due to timeout. In other words, the network device may automatically clear the subscription cache information when a timeout interval corresponding to the subscription operation is reached.

In addition, in consideration of a time sequence problem when a response packet is fed back by each network device, to prevent the first network device from incorrectly identifying a specific network device as the "isolated" network device when a previous-hop network device of the specific network device does not report a response packet after the network device reports the response packet, a cache mechanism may further be set in the first network device. In other words, after receiving the response packet, the first network device may wait for a specific time period before performing summarization and calculation of the forwarding path.

It should be further noted that a sequence of steps of the network device management method provided in this embodiment of the present application may be properly adjusted, or steps may be correspondingly added or deleted based on a situation. For example, step 108 and step 109 may be performed before step 105, or may be simultaneously performed with step 105. Any variation readily figured out by persons skilled in the art within the technical scope disclosed in this application shall fall within the protection scope of this application, and details are not described herein.

In conclusion, embodiments of the present application provide the network device management method. After obtaining management information of the service flow, the first network device in the autonomic networking may send the control packet to the next-hop second network device, where the control packet includes the management information, and the control packet is used to indicate the second network device to perform the management operation, obtain the information associated with the management operation, encapsulate the obtained information associated with the management operation into the response packet, and report the response packet to the first network device. In this way, the first network device can manage the second network device on the forwarding path. Because the management method may be triggered and implemented by the first network device, dependence on an NMS is eliminated, and management flexibility is improved. In addition, because no northbound interface needs to be deployed in each network device, management costs of the network device are effectively reduced, and a relatively efficient solution may be provided for some small-and medium-sized networks or internet of things (IoT).

In addition, the NMS queries a large quantity of entries from a network device to learn of a running status of the network device. Therefore, when a scale of the network is large, the NMS has an obvious performance problem. In addition, the NMS is limited by a northbound interface, and can perform only limited types of management operations. Therefore, it is difficult to accurately trace and manage a network device on a forwarding path of a service flow. When the NMS manages the network device, a simple network management protocol (SNMP) packet exchanged between the NMS and network device needs to be forwarded through a common forwarding entry (for example, a routing table). When the route is faulty (for example, a route selection error occurs), the NMS cannot locate and analyze the fault. In this case, the network device is in an unreachable state.

However, in the management method provided in this embodiment of the present application, the first network device in the autonomic networking may send the control packet by using the service plane, and receive, by using the control plane, the response packet reported by the second network device and the downstream network device of the second network device. The management process does not affect the service packet of the service flow. In addition, regardless of whether the service plane of the network device is faulty, it can be ensured that the response packet is sent to the first network device, so that the first network device can analyze and locate the fault in time. In addition, in the method provided in this embodiment of the present application, performing of the management operation and obtaining of the information associated with the management operation in the response packet are both performed by the second network device, but not performed by the NMS. Compared with the NMS, there are relatively rich types of management operations that can be performed inside the second network device. Therefore, management flexibility can further be improved.

In addition, the method provided in this embodiment of the present application has no dependency on the forwarding model of the service flow in the autonomic networking, can be applicable to various forwarding models, and has extensive adaptability. In addition, the administrator only needs to enter management information in the ingress network device of the service flow, to perform a specified management operation on each network device on the forwarding path of the service flow. The management method is easy to operate. Further, the management method is based on a security architecture-based ANIMA ANI, and has relatively high security. In addition, the management method provides a general management framework based on a service flow, and has good scalability.

Figure 7:
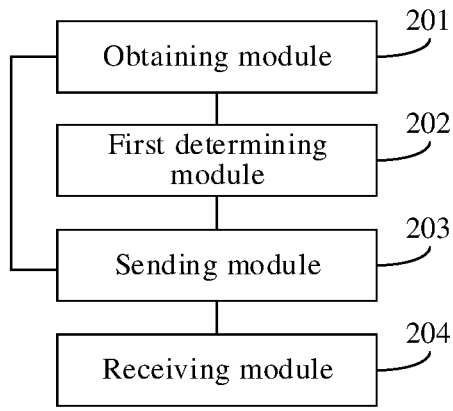
FIG. 7 is a schematic structural diagram of a network device management apparatus according to an embodiment of the present application.

FIG. 7 is a schematic structural diagram of a network device management apparatus according to an embodiment of the present application. The apparatus may be applied to a first network device in autonomic networking. Referring to FIG. 7, the apparatus may include the following modules.

An obtaining module 201 may be configured to implement the method shown in step 101 in the embodiment shown in FIG. 3.

A first determining module 202 may be configured to implement the method shown in step 102 in the embodiment shown in FIG. 3.

A sending module 203 may be configured to implement the method shown in step 104 in the embodiment shown in FIG. 3.

A receiving module 204 is configured to receive a response packet from a second network device, where the response packet includes information associated with a management operation. For an implementation process of the response packet, refer to the method shown in step 107 in the embodiment shown in FIG. 3. Details are not described herein again.

Optionally, the control packet sent by the sending module 203 may further include a task identifier and an identifier of an ingress network device of a service flow, the identifier of the ingress network device is an identifier of the first network device, and the task identifier is an identifier allocated by the first network device to the management operation of the service flow.

Optionally, the control packet further includes an identifier of a current network device, the identifier of the current network device is used to indicate a network device that currently sends the control packet, and the identifier of the current network device is an identifier of the first network device.

Optionally, the control packet further includes a type of to-be-obtained information; and the control packet is used to indicate the second network device to perform the management operation based on the type of the management operation and obtain information indicated by the type of the to-be-obtained information.

Optionally, the control packet further includes control information, and the control information includes at least one type of first forwarding control information and second forwarding control information.

The first forwarding control information is used to: when the second network device does not support the management operation, indicate the second network device to forward the control packet or stop forwarding the control packet.

The second forwarding control information is used to: when there are at least two next-hop network devices of the second network device, indicate the second network device to forward the control packet to one of the next-hop network devices, or forward the control packet to each of the next-hop network devices of the second network device.

Figure 8:
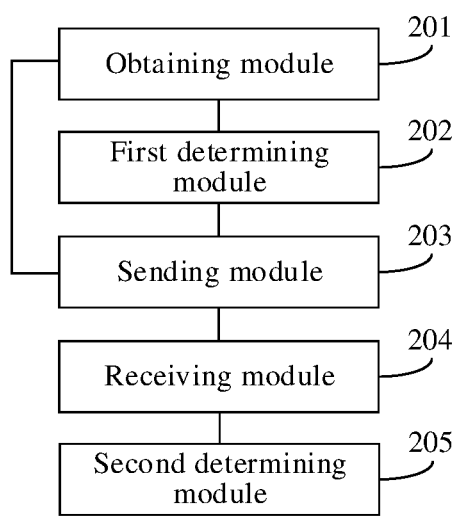
FIG. 8 is a schematic structural diagram of another network device management apparatus according to an embodiment of the present application.

Optionally, the response packet reported by the second network device further includes an identifier of the second network device and an identifier of a previous-hop network device of the second network device. FIG. 8 is a schematic structural diagram of another network device management apparatus according to an embodiment of the present application. Referring to FIG. 8, the apparatus may further include the following apparatus.

A second determining module 205 is configured to determine, based on the identifier of the second network device and the identifier of the previous-hop network device of the second network device, a network device included in the forwarding path of the service flow.

In conclusion, embodiments of the present application provide the network device management apparatus. After obtaining the management information of the service flow, the apparatus may send the control packet to the next-hop second network device, where the control packet includes the management information, and the control packet is used to indicate the second network device to perform the management operation, obtain the information associated with the management operation, encapsulate the obtained information associated with the management operation in the response packet, and report the response packet to the first network device. In this way, the first network device can manage the second network device on the forwarding path. Because the management method may be triggered and implemented by the first network device, dependence on an NMS is eliminated, and management flexibility is improved. In addition, because no northbound interface needs to be deployed in each network device, management costs of the network device are effectively reduced.

Figure 9:
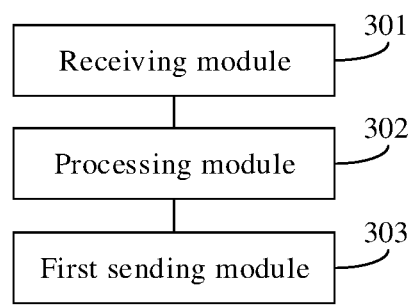
FIG. 9 is a schematic structural diagram of still another network device management apparatus according to an embodiment of the present application.

FIG. 9 is a schematic structural diagram of still another network device management apparatus according to an embodiment of the present application. The apparatus may be applied to a second network device in autonomic networking. Referring to FIG. 9, the apparatus may include the following modules.

A receiving module 301 is configured to receive a control packet from a first network device, where the control packet includes management information of a service flow, the management information includes a type of a management operation and an identifier of the service flow, and the first network device is an ingress network device of the service flow. For a function of the receiving module 301, refer to related descriptions of step 104 in the embodiment shown in FIG. 3. Details are not described herein again.

A processing module 302 may be configured to implement the method shown in step 105 in the embodiment shown in FIG. 3.

A first sending module 303 may be configured to implement the method shown in step 107 in the embodiment shown in FIG. 3.

Figure 10:
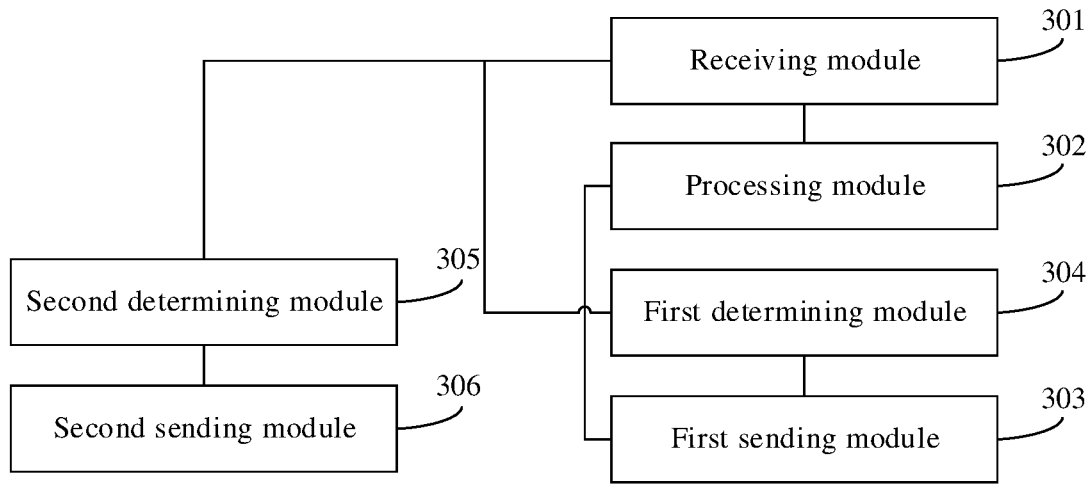
FIG. 10 is a schematic structural diagram of yet another network device management apparatus according to an embodiment of the present application.

Optionally, the control packet may further include an identifier of a current network device, the identifier of the current network device is used to indicate a network device that sends the control packet, and the network device that sends the control packet is a network device located at a previous hop of the second network device on a forwarding path of the service flow. FIG. 10 is a schematic structural diagram of yet another network device management apparatus according to an embodiment of the present application. Referring to FIG. 10, the apparatus may further include the following modules.

A first determining module 304 is configured to determine, based on the identifier of the current network device, that an identifier of the previous-hop network device of the second network device is the identifier of the current network device, in other words, determine the identifier of the current network device as the identifier of the previous-hop network device.

Correspondingly, the response packet may further include an identifier of the second network device and the identifier of the previous-hop network device of the second network device.

Optionally, as shown in FIG. 10, the apparatus may further include the following modules.

A second determining module 305 may be configured to implement the method shown in step 108 in the embodiment shown in FIG. 3.

A second sending module 306 may be configured to implement the method shown in step 109 in the embodiment shown in FIG. 3.

Optionally, the second sending module 306 may be configured to:

update the identifier of the current network device in the control packet by using the identifier of the second network device; and forward the updated control packet to the next-hop network device of the second network device.

Optionally, the control packet may further include a type of to-be-obtained information, and the processing module 302 may be configured to:

obtain information indicated by the type of the to-be-obtained information.

Optionally, the control packet further includes control information, and the control information includes at least one type of first forwarding control information and second forwarding control information.

When the control information includes the first forwarding control information, the second sending module 306 may be configured to:

when the second network device does not support the management operation, if the first forwarding control information is preset control information, forward the control packet to the next-hop network device; or when the control information includes the second forwarding control information, the second sending module 306 may be configured to:

when there are at least two next-hop network devices of the second network device, if the second forwarding control information is first control information, determine a target network device from the at least two next-hop network devices, and forward the control packet to the target network device; or if the second forwarding control information is second control information, forward the control packet to each of the next-hop network devices.

Optionally, the control packet further includes a task identifier and an identifier of the ingress network device of the service flow, where the identifier of the ingress network device is an identifier of the first network device, and the task identifier is an identifier allocated by the first network device to the management operation of the service flow; and the response packet further includes the task identifier.

In conclusion, embodiments of the present application provide the network device management apparatus. After receiving the control packet from the first network device, the apparatus may perform the management operation indicated by the type of the management operation in the control packet, to obtain the information associated with the management operation, encapsulate the obtained information in the response packet, and report the response packet to the first network device, so that the first network device can manage the second network device on the forwarding path. Because the management method may be triggered and implemented by the first network device, dependency on an NMS is eliminated, and management flexibility is improved.

In addition, because no northbound interface needs to be deployed in each network device, management costs of the network device are effectively reduced.

For the apparatus in the foregoing embodiment, an implementation of performing an operation by each module has been described in detail in the embodiment related to the method, and therefore is not described herein again.

Figure 11:
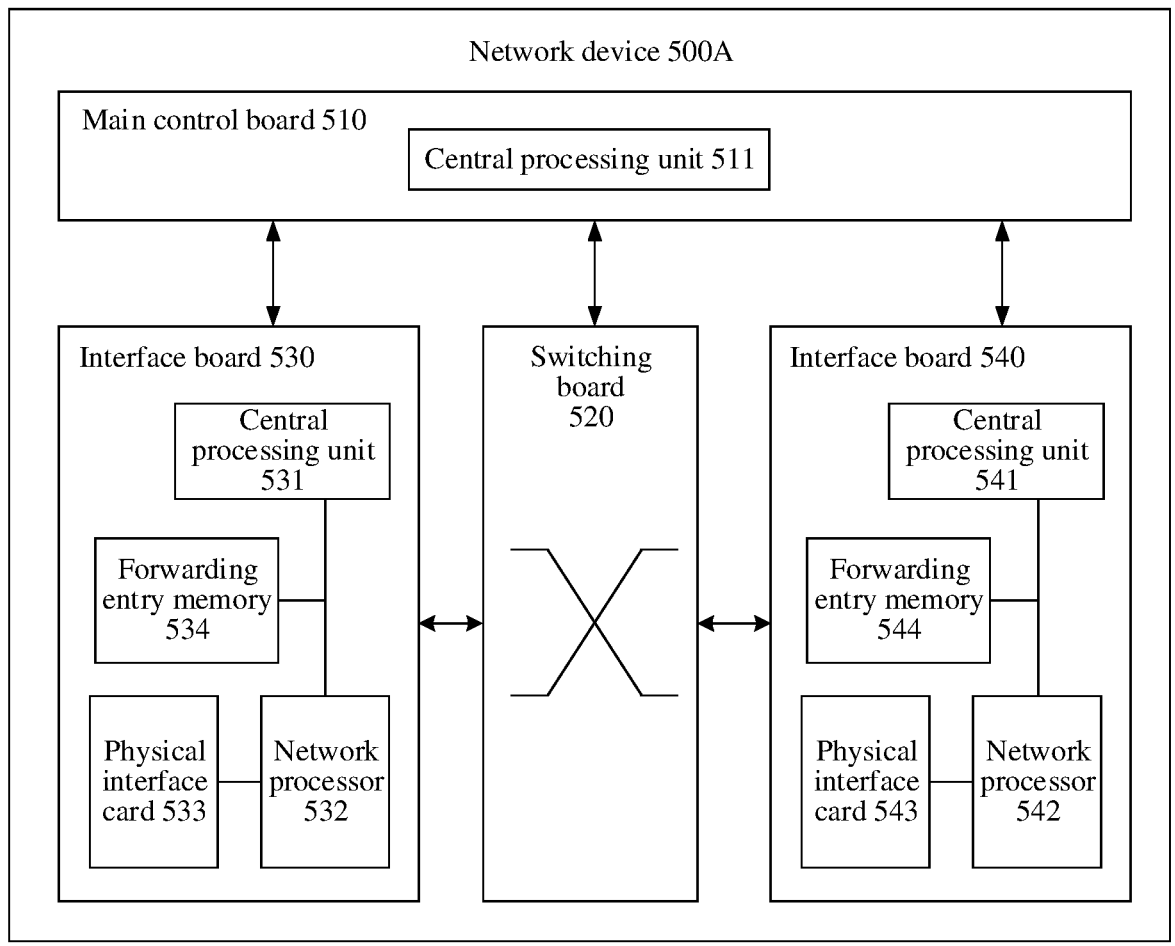
FIG. 11 is a schematic structural diagram of a network device according to an embodiment of the present application.

FIG. 11 is a schematic structural diagram of a network device according to an embodiment of the present application. Referring to FIG. 11, a network device 500A may include a main control board 510, and a switching board 520 and at least one interface board that are separately connected to the main control board 510. For example, in the structure shown in FIG. 11, the network device is provided with two interface boards: an interface board 530 and an interface board 540. The two interface boards establish a connection by using the switching board 520.

A central processing unit 511 is disposed in the main control board 510. The interface board 530 is provided with a central processing unit 531, a network processor 532, a physical interface card 533, and a forwarding entry memory 534. The central processing unit 531 is separately connected to the forwarding entry memory 534 and the network processor 532, and both the forwarding entry memory 534 and the physical interface card 533 are connected to the network processor 532. The interface board 540 is provided with a central processing unit 541, a network processor 542, a physical interface card 543, and a forwarding entry memory 544. The central processing unit 541 is separately connected to the forwarding entry memory 544 and the network processor 542, and both the forwarding entry memory 544 and the physical interface card 543 are connected to the network processor 542.

When the network device is a first network device, for a function of the main control board 510, refer to related descriptions in step 102, step 103, and step 110 in the embodiment shown in FIG. 3. For functions of the interface board 530, the interface board 540, and the switching board 520, refer to related descriptions in step 101, step 104, and step 107 in the embodiment shown in FIG. 3. Details are not described herein again.

When the network device is a second network device, for a function of the main control board 510, refer to related descriptions in step 105, step 106, step 107, and step 108 in the embodiment shown in FIG. 3. For functions of the interface board 530, the interface board 540, and the switching board 520, refer to related descriptions in step 104 and step 107 in the embodiment shown in FIG. 3. Details are not described herein again.

Figure 12:
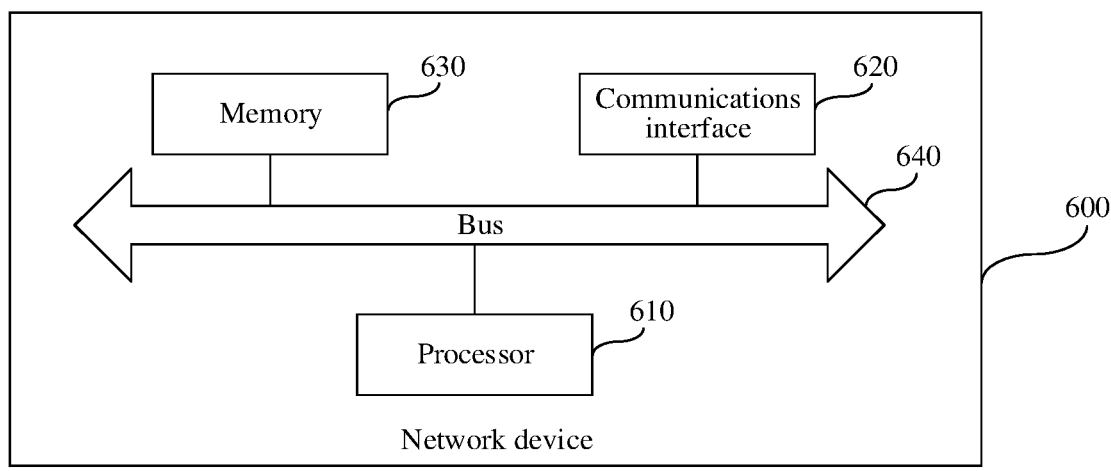
FIG. 12 is a schematic structural diagram of another network device according to an embodiment of the present application.

FIG. 12 is a schematic structural diagram of another network device according to an embodiment of the present application. Referring to FIG. 12, a network device 600 include a processor 610, a communications interface 620, and a memory 630. The communications interface 620 and the memory 630 are separately connected to the processor 610. For example, as shown in FIG. 12, the communications interface 620 and the memory 630 are connected to the processor 610 by using a bus 640.

The processor 610 may be a central processing unit (CPU), and the processor 610 includes one or more processing cores. The processor 610 executes various functional applications and data processing by running a software program.

There may be a plurality of communications interfaces 620. The communications interface 620 is used by the network device 600 to communicate with an external device, and the external device is, for example, a display or a third-party device (for example, a storage device or a mobile terminal).

The memory 630 stores a computer program that can run on the processor 610. The memory 630 may include but is not limited to a random access memory (RAM), a read-only memory (ROM), an erasable programmable read-only memory (EPROM), a flash memory, and an optical memory. The memory 630 is responsible for information storage. For example, the memory 630 is configured to store a software program.

Optionally, the network device 600 may further include an input/output (I/O) interface (not shown in FIG. 12). The I/O interface is connected to the processor 610, the communications interface 620, and the memory 630. For example, the I/O interface may be a universal serial bus (USB).

When the network device is a first network device, the processor 610 is configured to execute the computer program stored in the memory 630, and the processor 630 implements the method shown in step 101 to step 104 and step 110 in the embodiment shown in FIG. 3 by executing the computer program.

When the network device is a second network device, the processor 610 is configured to execute the computer program stored in the memory 630, and the processor 630 implements the method shown in step 105 to step 109 in the embodiment shown in FIG. 3 by executing the computer program.

Figure 13:
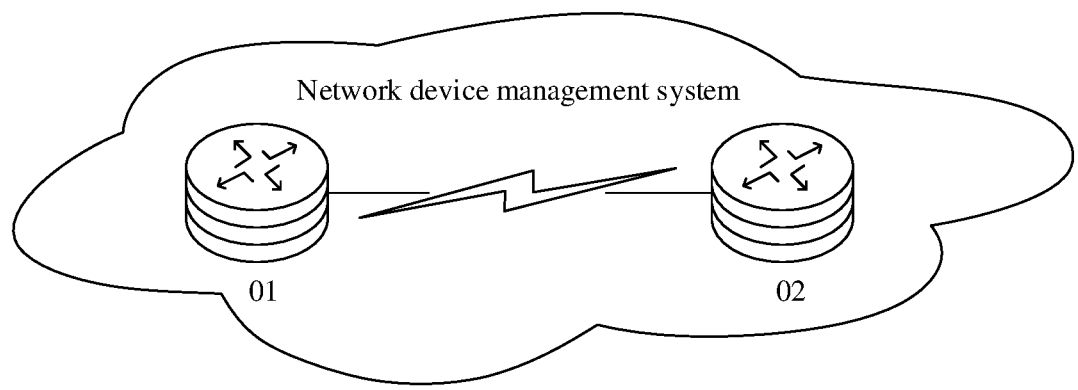
FIG. 13 is a schematic structural diagram of a network device management system according to an embodiment of the present application.

FIG. 13 is a schematic structural diagram of a network device management system according to an embodiment of the present application. The system may be applied to autonomic networking. As shown in FIG. 13, the system may include a first network device 01 and a second network device 02. Further, the system may further include a downstream network device of the second network device 02. For example, the management system in the autonomic networking shown in FIG. 2 may include the first network device R1, the second network device R2, and the downstream network devices R3 to R8 of the second network device R2.

The first network device 01 may include the apparatus shown in FIG. 7 or FIG. 8, or the first network device 01 may be the network device shown in FIG. 11 or FIG. 12. The second network device 02 may include the apparatus shown in FIG. 9 or FIG. 10, or the second network device 02 may be the network device shown in FIG. 11 or FIG. 12.

An embodiment of the present application provides a computer-readable storage medium. The computer-readable storage medium stores an instruction. When the computer-readable storage medium runs on a computer, the computer is enabled to perform the network device management method provided in the foregoing method embodiments.

An embodiment of the present application further provides a computer program product including an instruction. When the computer program product runs on a computer, the computer performs the network device management method provided in the foregoing method embodiment.

What is claimed is:

1. A method, wherein the method comprises:
    obtaining, by a first network device, management information of a service flow, wherein the management information comprises a type of a management operation and an identifier of the service flow, and wherein the first network device comprises an autonomic control plane (ACP) virtual routing forwarding (VRF) module and a service plane of autonomic networking;
    sending, by the first network device, a control packet to a second network device, using the service plane along a forwarding path of the service flow, wherein the second network device is a next-hop network device of the first network device, and wherein the control packet comprises the management information, and the control packet indicates the second network device to perform the management operation based on the type of the management operation and obtain information associated with the management operation; and
    receiving, by the first network device, a response packet from the second network device using the ACP VRF module, wherein the response packet comprises the information associated with the management operation.

2. The method according to claim 1, wherein the control packet further comprises a task identifier and an identifier of an ingress network device of the service flow, and the task identifier is an identifier allocated by the ingress network device to the management operation of the service flow.

3. The method according to claim 2, wherein the control packet further comprises an identifier of a current network device, the identifier of the current network device indicates a network device that currently sends the control packet, and the identifier of the current network device is an identifier of the first network device.

4. The method according to claim 1, wherein the control packet further comprises a type of to-be-obtained information, and the control packet indicates the second network device to perform the management operation based on the type of the management operation and obtain information indicated by the type of the to-be-obtained information.

5. The method according to claim 1,
    wherein the control packet further comprises control information, and the control information comprises at least one type of first forwarding control information or second forwarding control information,
    wherein the first forwarding control information indicates the second network device to forward the control packet or stop forwarding the control packet when the second network device does not support the management operation, and
    wherein the second forwarding control information indicates the second network device to forward the control packet to one of next-hop network devices or forward the control packet to each of the next-hop network devices of the second network device when there are at least two next-hop network devices of the second network device.

6. The method according to claim 1, wherein the response packet reported by the second network device further comprises an identifier of the second network device and an identifier of a previous-hop network device of the second network device, and the method further comprises:
    determining, based on the identifier of the second network device and the identifier of the previous-hop network device of the second network device, a network device comprised in the forwarding path of the service flow.

7. The method of claim 1, the management operation being one of a plurality of management operations including a query operation, a subscribe operation, an un-subscribe operation, and a re-subscribe operation.

8. The method of claim 7, wherein the control packet further includes identification information that uniquely identifies a management module in the second network device for performing the management operation, and wherein the control packet further includes timeout interval information configuring a timeout interval for the subscribe operation.

9. A first network device, wherein the first network device comprises a autonomic control plane (ACP) virtual routing forwarding (VRF) module and a service plane of autonomic networking, and wherein the first network device further comprises:
  at least one processor;
  a non-transitory memory copipled to the at least one processor and storing a program for execution by the at least one processor, the program including instructions to:
    obtain management information of a service flow, wherein the management information comprises a type of a management operation and an identifier of the service flow;
    send a control packet to a second network device using the service plane along a forwarding path of the service flow, wherein the second network device is a next-hop network device of the first network device, and wherein the control packet comprises the management information, and the control packet indicates the second network device to perform the management operation based on the type of the management operation and obtain information associated with the management operation; and
    receive a response packet from the second network device using the ACP VRF module, wherein the response packet comprises the information associated with the management operation.

10. The first network device according to claim 9, wherein the control packet further comprises a task identifier and an identifier of an ingress network device of the service flow, and the task identifier is an identifier allocated by the ingress network device to the management operation of the service flow.

11. The first network device according to claim 10, wherein the control packet further comprises an identifier of a current network device, the identifier of the current network device indicates a network device that currently sends the control packet, and the identifier of the current network device is an identifier of the first network device.

12. The first network device according to claim 9, wherein the control packet further comprises a type of to-be-obtained information, and the control packet indicates the second network device to perform the management operation based on the type of the management operation and obtain information indicated by the type of the to-be-obtained information.

13. The first network device according to claim 9,
  wherein the control packet further comprises control information, and the control information comprises at least one type of first forwarding control information or second forwarding control information,
  wherein the first forwarding control information indicates the second network device to forward the control packet or stop forwarding the control packet when the second network device does not support the management operation, and
  wherein the second forwarding control information indicates the second network device to forward the control packet to one of next-hop network devices or forward the control packet to each of the next-hop network devices of the second network device when there are at least two next-hop network devices of the second network device.

14. The first network device according to claim 9, wherein the response packet reported by the second network device further comprises an identifier of the second network device and an identifier of a previous-hop network device of the second network device, wherein the program further includes instructions to:
  determine, based on the identifier of the second network device and the identifier of the previous-hop network device of the second network device, a network device comprised in the forwarding path of the service flow.

15. A second network device, wherein the second network device comprises an autonomic control plane (ACP) virtual routing forwarding (VRF) module and a service plane of autonomic networking, and wherein the second network device further comprises:
  at least one processor;
  a non-transitory memory copipled to the at least one processor and storing a program for execution by the at least one processor, the program including instructions to:
    receive a control packet from a first network device using the service plane, wherein the control packet comprises management information of a service flow, the management information comprises a type of a management operation and an identifier of the service flow, and wherein the second network device is a next-hop network device of the first network device;
    perform the management operation based on the type of the management operation;
    obtain information associated with the management operation; and
    send a response packet to the first network device using the ACP VRF module, wherein the response packet comprises the information associated with the management operation.

16. The second network device according to claim 15, wherein the control packet further comprises an identifier of a current network device, the identifier of the current network device indicates a network device that sends the control packet, and the network device that sends the control packet is located at a previous hop of the second network device on a forwarding path of the service flow,
  wherein the program further includes instructions to determine, based on the identifier of the current network device, that an identifier of a previous-hop network device of the second network device is the identifier of the current network device, and
  wherein the response packet further comprises an identifier of the second network device and the identifier of the previous-hop network device of the second network device.

17. The second network device according to claim 16, wherein the program further includes instructions to:
  determine, based on the identifier of the service flow, a next-hop network device located at a next hop of the second network device on the forwarding path of the service flow; and
  forward the control packet to the next-hop network device of the second network device.

18. The second network device according to claim 17, wherein the program further includes instructions to:
  update the identifier of the current network device in the control packet by using the identifier of the second network device; and
  forward the control packet to the next-hop network device of the second network device.

19. The second network device according to claim 17,
  wherein the control packet further comprises control information, and the control information comprises at least one type of first forwarding control information or second forwarding control information, and wherein the program further includes instructions to:
forward the control packet to the next-hop network device in response to when the control information comprising the first forwarding control information, in response to the second network device not supporting the management operation, and in response to the first forwarding control information being preset control information.

20. The second network device according to claim 17, wherein the control packet further comprises control information, and the control information comprises at least one type of first forwarding control information or second forwarding control information, and wherein the program further includes instructions to:
perform, in response to the control information comprising the second forwarding control information and in response to at least two next-hop network devices of the second network device existing, at least one of:
determine, in response to the second forwarding control information being first control information, a target network device from the at least two next-hop network devices, and forward the control packet to the target network device; or
forward the control packet to each of the next-hop network devices in response to the second forwarding control information being second control information.

21. The second network device according to claim 15, wherein the control packet further comprises a type of to-be-obtained information, wherein the program further includes instructions to:
obtain information indicated by the type of the to-be-obtained information.

22. The second network device according to claim 15, wherein the control packet further comprises a task identifier and an identifier of an ingress network device of the service flow, wherein the task identifier is an identifier allocated by the ingress network device to the management operation of the service flow, and wherein the response packet further comprises the task identifier.

\* \* \* \* \*